US008438294B2

(12) United States Patent
Lampell et al.

(10) Patent No.: US 8,438,294 B2
(45) Date of Patent: *May 7, 2013

(54) APPLICATION PROGRAMMING INTERFACE, SYSTEM, AND METHOD FOR COLLABORATIVE ONLINE APPLICATIONS

(75) Inventors: Mike Lampell, Woodside, CA (US); Nathan Taylor, Scott Valley, CA (US); Christina Elizabeth Warren, San Jose, CA (US); Francois-Yves Bertrand, Sunnyvale, CA (US); Gabriel Belinsky, Cupertino, CA (US); Alan Dale Berfield, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/832,025

(22) Filed: Jul. 7, 2010

(65) Prior Publication Data

US 2011/0252145 A1 Oct. 13, 2011

Related U.S. Application Data

(60) Provisional application No. 61/321,854, filed on Apr. 7, 2010.

(51) Int. Cl.
*G06F 15/16* (2006.01)

(52) U.S. Cl.
USPC .......................................... 709/228; 709/227

(58) Field of Classification Search ........... 709/217–229
See application file for complete search history.

(56) References Cited

U.S. PATENT DOCUMENTS

| 7,646,775 B2 * | 1/2010 | Capone et al. ................. 370/401 |
| 7,995,594 B2 * | 8/2011 | Capone et al. ................. 370/401 |
| 8,060,626 B2 * | 11/2011 | Roy et al. ....................... 709/228 |
| 8,341,207 B2 * | 12/2012 | Werner et al. .................. 709/202 |
| 2006/0072569 A1 * | 4/2006 | Eppinger et al. .............. 370/389 |
| 2006/0215684 A1 * | 9/2006 | Capone .......................... 370/437 |
| 2008/0201480 A1 * | 8/2008 | He et al. ......................... 709/227 |
| 2008/0288580 A1 * | 11/2008 | Wang et al. .................... 709/203 |

(Continued)

FOREIGN PATENT DOCUMENTS

EP 2071809 * 6/2009

OTHER PUBLICATIONS

"Application Program Interface" Newton's Telecom Dictionary, 18th ed., Feb. 2002.*

(Continued)

*Primary Examiner* — Brendan Higa
(74) *Attorney, Agent, or Firm* — Blakely, Sokoloff, Taylor & Zafman LLP

(57) ABSTRACT

An application framework including different application programming interfaces (APIs) is described which performs a variety of mobile device functions in response to API calls from applications. For example, in response to relatively simple API calls made by applications the application framework manages the complex tasks associated with invitations and matchmaking. By way of example, the details of complex transactions such as establishing peer-to-peer connections between mobile devices may be transparent to the application developer, thereby simplifying the application design process. The application framework may include an application daemon for communicating with a first set of services and an applications services module for communicating with a separate set of services. The application framework may also include a cache for caching data for each of the services based on different cache management policies driven by each of the services. The cache may be updated by push notification cache updates sent from each of the services.

30 Claims, 28 Drawing Sheets

U.S. PATENT DOCUMENTS

| | | | |
|---|---|---|---|
| 2009/0276803 A1* | 11/2009 | Weaver | 725/32 |
| 2010/0100630 A1* | 4/2010 | Jiang | 709/228 |
| 2010/0118874 A1* | 5/2010 | Li | 370/389 |
| 2010/0146126 A1* | 6/2010 | Lin et al. | 709/228 |
| 2010/0153560 A1* | 6/2010 | Capone et al. | 709/227 |
| 2011/0286471 A1* | 11/2011 | Capone et al. | 370/469 |

* cited by examiner

NAT Compatibility Chart 1400

| A/B | Unknown | Full Cone | Port Restricted | Symmetric | Closed |
|---|---|---|---|---|---|
| Unknown | 0.0 | 1.0 | 0.0 | 0.0 | 0.0 |
| Full Cone | 1.0 | 1.0 | 1.0 | 1.0 | 0.0 |
| Port Restricted | 0.0 | 1.0 | 1.0 | 0.0 | 0.0 |
| Symmetric | 0.0 | 1.0 | 0.0 | 0.0 | 0.0 |
| Closed | 0.0 | 0.0 | 0.0 | 0.0 | 0.0 |

Request Table 1502

| RID | MSI | Request Data |
|---|---|---|
| A | 1:1 | Request Data A |

MSI Table 1503

| MSI | Lease | MM ID |
|---|---|---|
| 1:1 | N/A | N/A |

Fig. 17b

Request Table 1502

| RID | MSI | Request Data |
|---|---|---|
| A | 1:1 | Request Data A |
| B | 1:1 | Request Data B |

MSI Table 1503

| MSI | Lease | MM ID |
|---|---|---|
| 1:1 | N/A | N/A |

Fig. 17c

Request Table 1502

| RID | MSI | Request Data |
|---|---|---|
| A | 1:1 | Request Data A |
| B | 1:1 | Request Data B |

MSI Table 1503

| MSI | Lease | MM ID |
|---|---|---|
| 1:1 | 5 sec | MM # N |

Fig. 17d

Request Table 1502

| RID | MSI | Request Data |
|---|---|---|
| A | Done | *Request Data B* |
| B | Done | *Request Data A* |

MSI Table 1503

| MSI | Lease | MM ID |
|---|---|---|
| 1:1 | 5 sec | MM # N |

APPLICATION PROGRAMMING INTERFACE, SYSTEM, AND METHOD FOR COLLABORATIVE ONLINE APPLICATIONS

CLAIM TO PRIORITY

This application claims the benefit of U.S. Provisional Application Ser. No. 61/321,854, filed on Apr. 7, 2010, entitled, "Application Programming Interface, System, And Method For Collaborative Online Applications".

BACKGROUND

1. Field of the Invention

This invention relates generally to the field of data. More particularly, the invention relates to an improved application programming interface, system and method for collaborative online applications such as multi-player games.

2. Description of Related Art

A. Network Address Translation ("NAT")

Large public networks, such as the Internet, frequently have connections to smaller private networks, such as those maintained by a corporation, Internet service provider, or even individual households. By their very nature, public networks must have a commonly agreed upon allocation of network addresses, i.e., public addresses. For a variety of reasons, maintainers of private networks often choose to use private network addresses for the private networks that are not part of the commonly agreed upon allocation. Thus, for network traffic from the private network to be able to traverse the public network, some form of private/public network address translation ("NAT") is required.

A device performing NAT operations alters the data packets being sent out of the private network to comply with the addressing scheme of the public network. Particularly, the network address translator replaces the originating private address and port number of a packet with its own public address and an assigned port number. A network address translator also alters the data packets being received for computers on the private network to replace the destination public address and port number with the correct private address and port number of the intended recipient. As used herein, the term address should be construed to include both an address and a port number if appropriate in the context, as would be understood by one of ordinary skill in the art.

NAT has become increasingly common in modern network computing. One advantage of NAT is that it slows the depletion of public network address space. For example, TCP/IP addressing, which is used on the Internet, comprises four strings of three digits each, thus providing a finite address space. Additionally, certain portions of this address space are reserved for particular uses or users, further depleting the actual number of addresses available. However, if NAT is used, a private network or subnet may use an arbitrary number of addresses, and still present only a single, standardized public address to the outside world. This makes the number of available addresses practically limitless, because each private network could, theoretically, use exactly the same private addresses.

One advantage provided by NAT is increased security arising from the fact that those on the public network cannot determine the actual (i.e., private) network address of a computer on a private network. This is because only the public address is provided on the public network by the network address translator. Additionally, this public address may correspond to any number of computers on the private network.

Different NAT types employ different levels of security. For example, with a "full cone NAT," once an internal address (iAddr:iPort) is mapped to an external address (eAddr:ePort), any external host can send packets to iAddr:iPort by sending packets to eAddr:ePort. With a "restricted cone NAT," an external host with an address hAddr can send packets to iAddr:iPort by sending packets to eAddr:ePort only if iAddr:iPort had previously sent a packet to hAddr. The port of the external host is irrelevant. With a "Port Restricted Cone NAT," an external host having an address/port hAddr: can send packets to iAddr:iPort by sending packets to eAddr:ePort only if iAddr:iPort previously sent a packet to hAddr:hPort. Finally, with a Symmetric NAT, each request from the same iAddr:iPort to a specific destination IP address and port is mapped to a unique eAddr:ePort. If the same internal host sends a packet to a different destination, a different external address and port mapping is used. Only an external host that receives a packet from an internal host can send a packet back to the internal host.

B. Nat Issues with Peer-to-Peer Networking

Peer-to-peer ("P2P") computing refers to a distributed network architecture comprised of computing nodes which make a portion of their resources directly available to other network participants. Peers in a P2P network establish direct communication channels with one another and act as both clients and servers, in contrast to the traditional client-server model in which servers supply resources and clients consume resources.

The NAT operations described above pose numerous problems for P2P connections. For example, establishing a direct connection between two peers becomes increasingly difficult if one or both of the peers is located behind one or more of the NAT types described above. This problem is exacerbated by the fact that mobile devices such as the Apple iPod Touch®, Apple iPhone®, Apple iPad® and various other devices (e.g., RIM Blackberry® devices, Palm Pre® devices, etc) are frequently moved between networks having different NAT implementations. For example, the Apple iPhone™ is capable of communicating over Wi-Fi networks (e.g., 802.11b, g, n networks); 3G networks (e.g., Universal Mobile Telecommunications System ("UMTS") networks, High-Speed Uplink Packet Access ("HSUPA") networks, etc); and Bluetooth networks (known as personal area networks ("PANs")). Future mobile devices will be capable of communicating over additional communication channels such as WiMAX, International Mobile Telecommunication ("IMT") Advanced, and Long Term Evolution ("LTE") Advanced, to name a few.

SUMMARY

An application framework including different application programming interfaces (APIs) is described which performs a variety of mobile device functions in response to API calls from applications. For example, in response to relatively simple API calls made by applications the application framework manages the complex tasks associated with invitations and matchmaking. By way of example, the details of complex transactions such as establishing peer-to-peer connections between mobile devices may be transparent to the application developer, thereby simplifying the application design process. The application framework may include an application daemon for communicating with a first set of services and an applications services module for communicating with a separate set of services. The application framework may also include a cache for caching data for each of the services based on different cache management policies driven by each of the services. The cache may be updated by push notification cache updates sent from each of the services.

BRIEF DESCRIPTION OF THE DRAWINGS

A better understanding of the present invention can be obtained from the following detailed description in conjunction with the following drawings, in which:

FIG. 14 illustrates one embodiment of a NAT compatibility chart for determining NAT compatibility.

FIGS. 17a-d illustrate an exemplary series of table updates performed to match users/devices.

DETAILED DESCRIPTION OF PREFERRED EMBODIMENTS

Described below are embodiments of an apparatus, method, and machine-readable medium for establishing, maintaining and utilizing primary and/or backup peer-to-peer ("P2P") communication channels on a network. An invitation service and a matchmaker service are also described for inviting users and matching users, respectively, for P2P sessions. Additionally, a relay service is described to allow users to establish relay connections under certain specified conditions. Finally, an application framework and associated application programming interface (API) are described to allow application developers to design applications which take advantage of various collaborative online features described herein.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Figure 1:
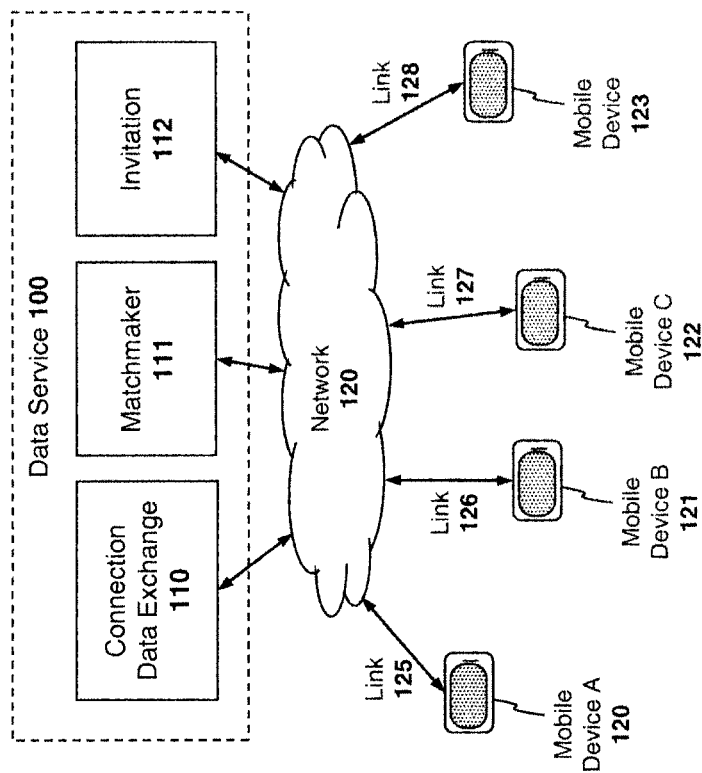
FIG. 1 illustrates a network architecture in which a group of mobile devices and services communicate over a network.

Apparatus and Method for Efficiently and Securely Exchanging Connection Data As illustrated in FIG. 1, a general network topology implemented in one embodiment of the invention can include a group of "client" or "peer" mobile computing devices A-D, 120-123, respectively, communicating with one another and with one or more services 110-112 over a network 120. Although illustrated as a single network cloud in FIG. 1, the "network" 120 can include a variety of different components including public networks such as the Internet and private networks such as local Wi-Fi networks (e.g., 802.11n home wireless networks or wireless hotspots), local area Ethernet networks, cellular data networks (e.g., 3G, Edge, etc), and WiMAX networks, to name a few. For example, mobile device A 120 may be connected to a home Wi-Fi network represented by network link 125, mobile device B 121 may be connected to a 3G network (e.g., Universal Mobile Telecommunications System ("UMTS"), High-Speed Uplink Packet Access ("HSUPA"), etc) represented by network link 126, mobile device C 122 may be connected to a WiMAX network represented by network link 127, and mobile device 123 may be connected to a public Wi-Fi network represented by network link 128. Each of the local network links 125-128 over which the mobile devices 120-123 are connected may be coupled to a public network such as the Internet through a gateway and/or NAT device (not shown in FIG. 1), thereby enabling communication between the various mobile devices 120-123 over the public network. However, if two mobile devices are on the same local or private network (e.g., the same Wi-Fi network), then the two devices may communicate directly over that local/private network, bypassing the public network. It should be noted, of course, that the underlying principles of the invention are not limited to any particular set of network types or network topologies.

Each of the mobile devices 120-123 illustrated in FIG. 1 can communicate with a connection data exchange (CDX) service 110, a matchmaker service 111, and an invitation service 112. In one embodiment, the services 110-112 can be implemented as software executed across one or more physical computing devices such as servers. As shown in FIG. 1, in one embodiment, the services 110-112 may be implemented within the context of a larger data service 100 managed by the same entity (e.g., the same data service provider) and accessible by each of the mobile devices 120-123 over the network 120. The data service 100 can include a local area network (e.g., an Ethernet-based LAN) connecting various types of servers and databases. The data service 100 may also include one or more storage area networks ("SANs") for storing data. In one embodiment, the databases store and manage data related to each of the mobile devices 120-123 and the users of those devices (e.g., user account data, device account data, user application data, . . . etc.).

In one embodiment, matchmaker service 111 can match two or more mobile devices for a collaborative P2P session based on a specified set of conditions. For example, users of two or more of the mobile devices may be interested in playing a particular multi-player game. In such a case, the matchmaker service 111 may identify a group of mobile devices to participate in the game based on variables such as each user's level of expertise, the age of each of the users, the timing of the match requests, the particular game for which a match is requested and various game-specific variables. By way of example, and not limitation, the matchmaker service 111 may attempt to match users with similar levels of expertise at playing a particular game. Additionally, adults may be matched with other adults and children may be matched with other children. Moreover, the matchmaker service 111 may prioritize user requests based on the order in which those requests are received. The underlying principles of the invention are not limited to any particular set of matching criteria or any particular type of P2P application.

As described in detail below, in response to a match request, the matchmaker service 111 can coordinate with the CDX service 110 to ensure that all matched participants receive the necessary connection data for establishing P2P sessions in an efficient and secure manner.

In one embodiment, the invitation service 112 also identifies mobile devices for participation in collaborative P2P sessions. However, in the case of the invitation service 112, at least one of the participants is specifically identified by another participant. For example, the user of mobile device A 120 may specifically request a collaborative session with the user of mobile device B 121 (e.g., identifying mobile device B with a user ID or phone number). As with the matchmaker service 111, in response to an invitation request, the invitation service 112 can identify the set of participants and coordinate with the CDX service 110 to ensure that all participants receive the necessary connection data for establishing P2P sessions in an efficient and secure manner.

As mentioned above, in one embodiment, the CDX service 110 operates as a central exchange point for connection data required to establish P2P sessions between two or more mobile devices. Specifically, one embodiment of the CDX service generates NAT traversal data (sometimes referred to as "Hole Punch" data) in response to mobile device requests to enable external services and clients to communicate through the NAT of each mobile device (i.e., to "punch a hole" through the NAT to reach the device). For example, in one embodiment, the CDX service detects the external IP address and port needed to communicate with the mobile device and provides this information to the mobile device. In one embodiment, the CDX service also receives and processes lists of mobile devices generated by the matchmaker service 111 and invitation service 112 and efficiently and securely distributes connection data to each of the mobile devices included on the lists (as described in detail below).

In one embodiment, communication between the mobile devices and the CDX service 110 is established using a relatively lightweight network protocol such as User Datagram Protocol ("UDP") sockets. As is known by those of skill in the art, UDP socket connections do not require hand-shaking dialogues for guaranteeing packet reliability, ordering, or data integrity and, therefore, do not consume as much packet processing overhead as TCP socket connections. Consequently, UDP's lightweight, stateless nature is useful for servers that answer small queries from a vast number of clients. Moreover, unlike TCP, UDP is compatible with packet broadcasting (in which packets are sent to all devices on a local network) and multicasting (in which packets are sent to a subset of devices on the local network). As described below, even though UDP may be used, security can be maintained on the CDX service 110 by encrypting NAT traversal data using session keys.

In contrast to the low-overhead, lightweight network protocol used by the CDX service 110, in one embodiment, communication between the mobile devices 120-123 and the matchmaker service 111 and/or invitation service 112 is established with an inherently secure network protocol such as Hypertext Transfer Protocol Secure ("HTTPS"), which relies on Secure Sockets Layer ("SSL") or Transport Layer Security ("TLS") connections. Details associated with these protocols are well known by those of skill in the art.

Figure 2A:
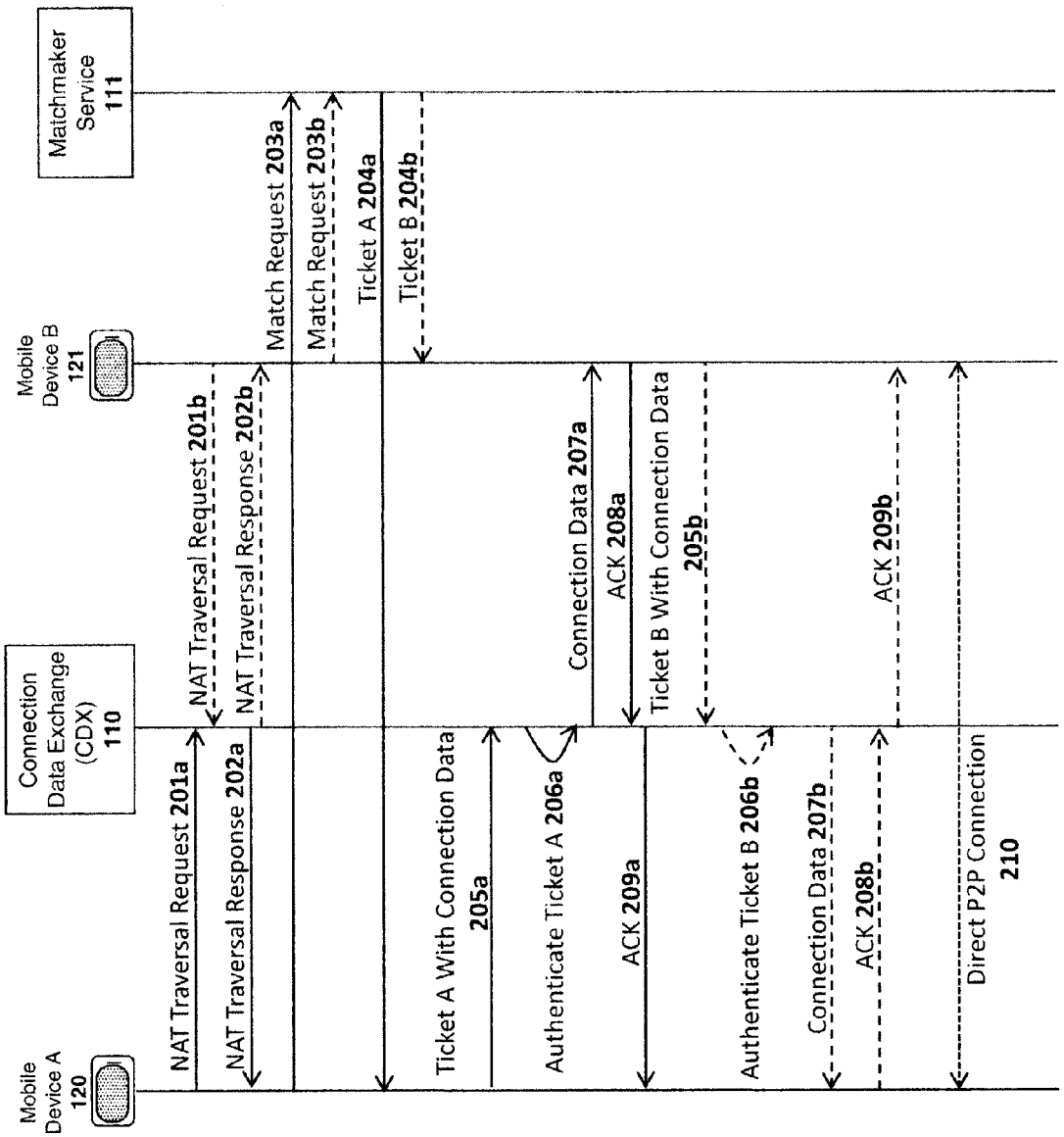
FIGS. 2a-c illustrate transactions between one embodiment of a connection data exchange (CDX) service, a matchmaker service and/or an invitation service.

FIG. 2a illustrates an exemplary series of transactions which can be implemented by a CDX server. When describing the operation of one embodiment of the CDX service, the following terms shall have the following meanings:

Connection Data

This is the information which potential peers need to exchange with each other to establish a Peer-To-Peer Session. Described below are embodiments of a mechanism for how this information can be exchanged.

CDX Server

A CDX Server in one embodiment is an authenticated multicast reflector which allows authorized entities to exchange arbitrary data. This data is referred to as the Payload.

CDX Session

A CDX Session refers to a group of client devices which can communicate with each other via the CDX Server. Each client device which is a part of the session is assigned a CDX Ticket. Each session has a unique CDX Session ID, which is a large integer which can be used to identify or refer to an individual session.

CDX Request

A request that is sent from a client device to the CDX Server. A request generally consists of two parts: a CDX Ticket and the Payload. In this embodiment, the payload is Connection Data encrypted with the Session Key.

CDX Response

A CDX Response is what is "reflected" back to the other devices in a CDX Session when the CDX Server receives a CDX Request from a member of the CDX Session. It is constructed by appending the Payload to the CDX Ticket Stub of the CDX Ticket used in the given CDX Request.

CDX Ticket

Figure 3:
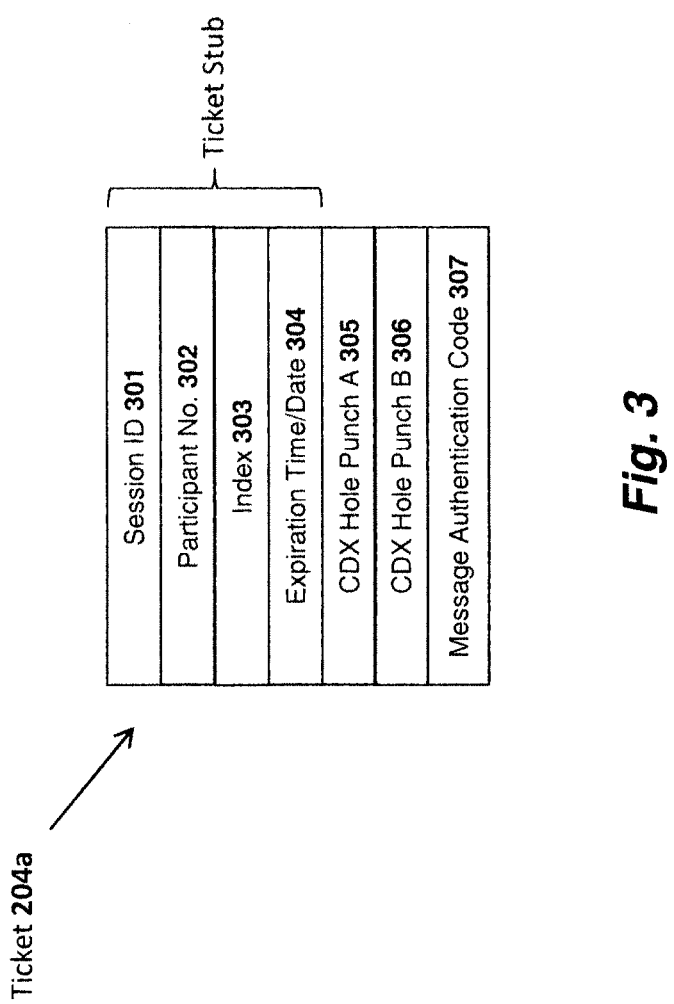
FIG. 3 illustrates a one embodiment of a ticket data structure.

A CDX Ticket tells the CDX Server how to send a Payload to the members of the CDX Session. In one embodiment, it is "signed" with the CDX Ticket Key to prevent forgery or tampering. As illustrated in FIG. 3, in one embodiment, a CDX Ticket contains the following information:

The Session ID 301 which is not encrypted or obfuscated in one embodiment.

The number of participants 302 in the session which is not encrypted or obfuscated in one embodiment.

The index 303 of which participant in the session that this ticket refers to (not encrypted or obfuscated in one embodiment).

An expiration time/date 304, after which the ticket is considered invalid (not encrypted or obfuscated in one embodiment).

The CDX Hole-Punch Data 305-306 for each participant in the session, encrypted using the CDX Ticket Key in one embodiment.

A Message Authentication Code 307 using the CDX Ticket Key, which acts as a "Digital Signature" to ensure that the ticket is authentic.

CDX Ticket Stub

The first part of a CDX Ticket, minus the CDX Hole-Punch Data and the Message Authentication Code.

Payload

This is the second part of a CDX Request and a CDX Response. The payload is the data that a client device wishes to communicate to other devices in the CDX Session. In this embodiment, the payload is the Connection Data encrypted with the Session Key. The CDX Server does not decrypt the payload, in one embodiment, it simply passes it along unchanged.

Session Key

This is the key used by the clients to encrypt the Connection Data. In one embodiment, this key is not known to the CDX server. In this embodiment, the Session Key is generated by the matchmaking service and transmitted to the clients along with their individual CDX Tickets.

CDX Ticket Key

This is the key used to create and "sign" CDX Tickets. The CDX Ticket Key is known only by the CDX Server and the service which generates CDX Tickets—which, as described below, could be the matchmaking service and/or the invitation service.

CDX Hole-Punch Request

A special type of CDX Request which is used to obtain the CDX Hole-Punch Data from the CDX Server.

CDX Hole-Punch Data

This is an opaque data blob that describes how the CDX Server can send information to the client which originally requested it. It is obtained by sending a CDX Hole-Punch Request to the CDX Server. CDX Hole-Punch Data must be collected from each client device in the CDX Session before CDX Tickets can be generated. The CDX Hole-Punch data (sometimes referred to as "NAT traversal data") may include the public IP address and port of a requesting device.

Turning now to FIG. 2a, in one embodiment, the mobile device A 120 and mobile device B 121 can be executing a collaborative application such as a multi-player game or a collaborative chat session which requires a P2P connection with one or more other computing devices. At 201a, mobile device A 120 transmits a CDX Hole-Punch Request to the CDX Server 110. The CDX Server 110 then responds with the CDX Hole-Punch Data at 202a. In one embodiment, the hole punch data includes the public IP address and port of mobile device A and/or any other data needed to punch a hole through mobile device A's NAT (e.g., NAT type data defining mobile device A's NAT type). Similar transactions are performed for mobile device B at 201b and 202b, respectively.

At 203a and 203b, mobile devices A and B then send match requests including the CDX Hole-Punch Data to the Matchmaking Service, along with any additional matching criteria (described below). At this stage, mobile devices A and B may begin to construct the Connection Data needed to establish a P2P connection. This may be accomplished, for example, using a transaction such as a standard Internet Connectivity Establishment ("ICE") transaction (e.g., by a NAT traversal service). However, the underlying principles of the invention are not limited to any particular mechanism for determining connection data.

In one embodiment, once the matchmaking service 111 has found a set of client devices with matching criteria, it may generate a unique CDX Session ID, a unique CDX Ticket for each member of the CDX Session, and a unique Session Key. In one embodiment, the matchmaking service 111 may encrypt the CDX Hole-Punch Data for the CDX ticket using a unique CDX ticket key. At 204a and 204b, the Matchmaking service then may then send each of the mobile devices A and B their CDX Ticket and the Session Key.

Mobile device A receives the CDX Ticket and Session Key and encrypts its previously determined Connection Data using the Session Key, making a Payload. In one embodiment, mobile device A constructs a CDX Request by appending the constructed Payload to the CDX Ticket. At 205a, mobile device A sends the CDX Request to the CDX Server 110. Mobile device B could also performs the same operations and transmit a request to the CDX server at 205b.

At 206a, the CDX Server 110 receives the CDX Request, examines the ticket to ensure that it is valid and authentic (e.g., based on the message authentication code 307). If the CDX Ticket is invalid, the request is dropped. In one embodiment, the CDX Server then decrypts the CDX Hole-Punch Data set that is contained in the CDX Ticket using the CDX ticket key. In one embodiment, the CDX ticket key can include an expiration time/date which may also be transmitted with the tickets. The CDX service 110 and the matchmaker service 111 can store two (or more) different CDX ticket keys for encryption/decryption—a first which is currently active and a second which will become active upon reaching the expiration time/date of the first. Upon receiving a ticket, the CDX service 110 can read the expiration time/date to determine which ticket key to use. When a CDX ticket key has expired, both the CDX service 110 and the matchmaker service 111 can each generate a new ticket key (which will be the next key to be used after the current ticket key expires). In one embodiment, the CDX service 110 and matchmaker service 111 execute the same key generation algorithm to ensure consistency with the two ticket keys. For example, techniques such as those used for the well-known RSA SecurID authentication mechanism may be used in which a new authentication code is generated at fixed intervals. In one embodiment, a new CDX ticket key is generated on a daily basis. However, the underlying principles of the invention are not limited to any particular mechanism for generating CDX ticket keys.

The same operations could be performed as shown at 206b for mobile device B. The CDX Server constructs a CDX Response from the CDX Request and then uses the CDX Hole-Punch Data to send the CDX Response to the participants in the CDX Session (sending to mobile device B at 207a and to mobile device A at 207b).

Mobile device B receives the CDX Response 207a from the CDX Server. Client Device B examines the CDX Ticket Stub to ensure that the Session ID matches the Session ID of its own CDX Ticket. Mobile device B may then decrypt the Payload using the Session Key, yielding the Connection Data from Mobile device A. Mobile device B then uses the Connection Data from Mobile device A to begin the process of establishing the P2P session. In one embodiment, these involve standard ICE transactions. However, the underlying principles of the invention are not limited to any particular mechanism for establishing P2P communication.

As mentioned above, in one embodiment, mobile device A and B establish Hypertext Transfer Protocol Secure ("HTTPS") sessions to communicate with the matchmaker service 111 (e.g., using HTTPS request/response transactions) and establish UDP sockets to communicate with the CDX service. The match requests 204*a*, 204*b* can include the NAT type and the hole punch data (e.g., the public IP address and port) previously determined for each respective mobile device. In an embodiment which involves a multi-player game, each match request can identify the player on each mobile device (e.g., using a unique player ID code), the game that each user wishes to play, the number of players to participate in the game, and/or other game configuration variables associated with the desired game. By way of example, and not limitation, the game configuration variables associated with a game may include a level of difficulty (e.g., easy, normal, difficult), a user's age (e.g., "under 13"), a sub-region of the game (e.g., "level 2"), and/or a level of player expertise (e.g., expert, beginner, intermediate). As described in detail below, these variables are sometimes referred to as a game "bucket" and are identified using a unique "bucket ID." Each game may include different sets of bucket IDs to identify different game configuration variables.

In one embodiment, mobile device B sends and acknowledgement at 208*a* and 209*a*. Similarly, mobile device A's acknowledgement is transmitted at 208*b* and 209*b*. If mobile device A's or B's acknowledgements are not received after a specified period of time, then the connection data 207*a* may be resent to mobile device B 212. Either the CDX service 110 may initiate the retry and/or mobile device A 120 may initiate the retry.

Figure 2B:
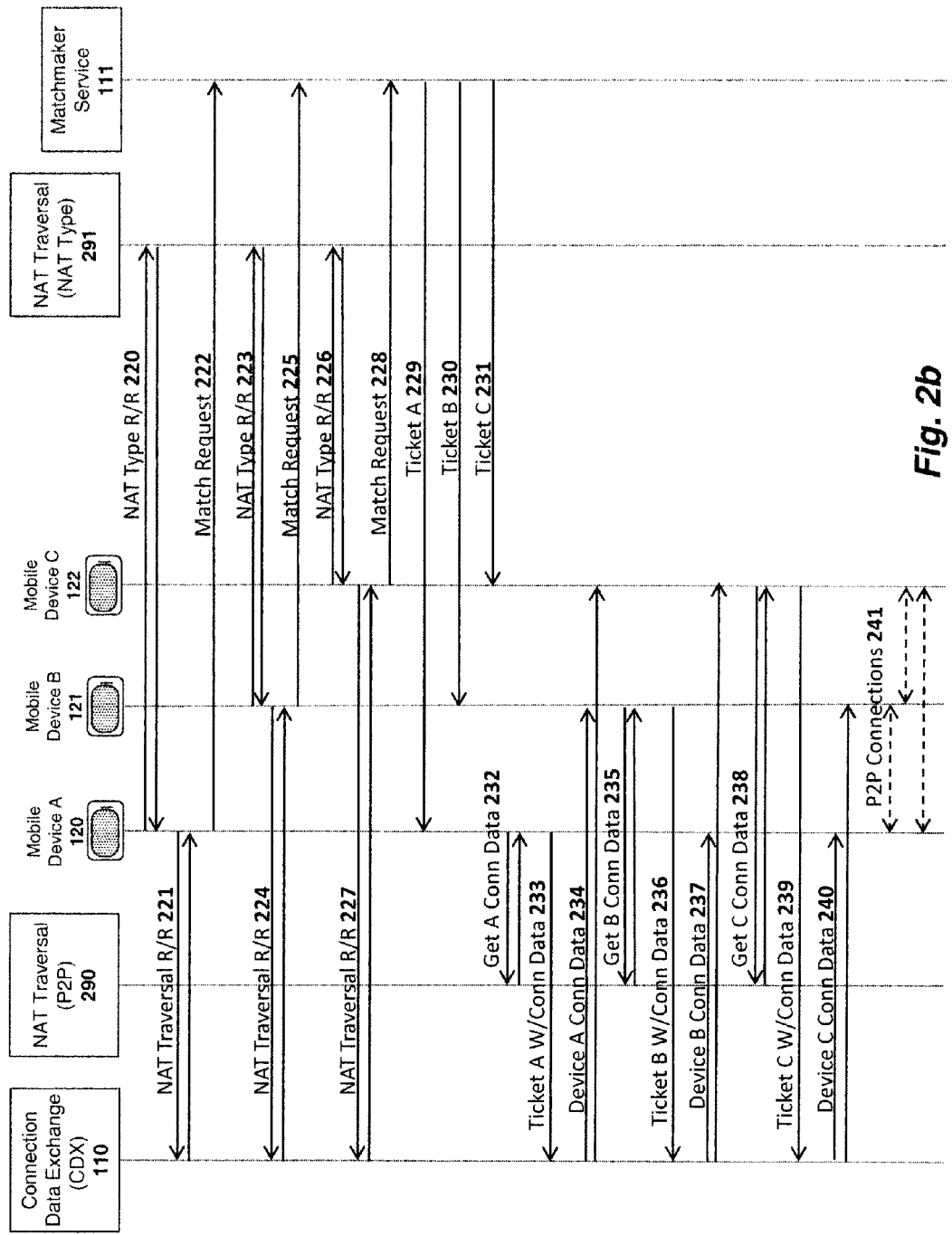

FIG. 2*b* illustrates a more detailed example in which three different mobile devices 120-122 negotiate for P2P connections using the CDX service and matchmaker service 111. FIG. 2*b* also illustrates two additional services used by the mobile devices 120-122 to establish a connection: a NAT traversal service 291 for determining NAT type and a NAT traversal service 290 for determining the full connection data for each mobile device (e.g., utilizing an ICE connection data transaction). It should be noted, however, that separate services are not required to comply with the underlying principles of the invention. For example, in an alternate embodiment, the NAT traversal functions performed by each of these services 290-291 may be integrated directly within the CDX service 110 and/or matchmaker service 111. Similarly, the functions performed by the both NAT traversal services 290-291 may be integrated within a single NAT traversal service. In summary, the specific functional separation shown in FIG. 2*b* is not required for complying with the underlying principles of the invention.

Turning now to the specific details of FIG. 2*b*, at 220, mobile device A transmits a NAT type request to the NAT traversal service 291. In response, the NAT traversal service 291 may use various known techniques including implementing a series of transactions to determine the NAT type used by mobile device A. For example, the NAT traversal service 291 may attempt to open different IP addresses and ports on mobile device A's NAT and communicate with mobile device A through those ports using different IP/port combinations. In this manner, the NAT employed by mobile device A may be classified as one of the NAT types described above (e.g., full cone, restricted cone, port restricted cone, symmetric) or an alternative NAT type. This information may then be provided to mobile device A 120 as illustrated.

At 221, mobile device A 120 initiates a NAT traversal request with the CDX service 110. In response, the CDX service 110 can read the public IP address and public port number used for the request and transmits this information back to mobile device A 120. As described above, if a device is behind a NAT, its public port and IP address will be different from its private port and IP address, respectively. Thus, depending on the type of NAT being used, the public IP address and port may be used to "punch a hole" through the NAT device to reach the mobile device.

At 222, mobile device A 120 transmits a match request 222 to the matchmaker service 111. As described above, in one embodiment, mobile device A communicates to the matchmaker service 111 using Hypertext Transfer Protocol Secure ("HTTPS") sessions (e.g., using HTTPS request/response transactions). The match request can include the NAT type and the hole punch data (e.g., the public IP address and port) previously determined for mobile device A 120. In an embodiment which involves a multi-player game, the match request can identify the player on mobile device A (e.g., using a unique player ID code), the game that the user wishes to play, the number of players to participate in the game, and/or other game configuration variables associated with the desired game (as previously described with respect to FIG. 2*a*).

At 223-225 a set of transactions corresponding to transactions 220-222 are performed for mobile device B 121 and at 226-228 a set of transactions corresponding to transactions 220-222 are performed for mobile device C 122. Thus, following transaction 228, the matchmaker service 111 has received match requests for all three of the mobile devices 120-122. In this specific example, the match requests result in mobile devices 120-122 being matched for a particular collaborative session such as a multi-player game (e.g., the users of these mobile devices may have selected the same game with the same, or similar, sets of variables, thereby resulting in a match by the matchmaker service 111).

The matchmaker service 111 uses the data contained in each of the match requests to generate Ticket A, which it transmits to mobile device A at 229; Ticket B, which it transmits to mobile device B at 230; and Ticket C, which it transmits to mobile device C at 231. Although not shown in FIG. 2*b*, the matchmaker service 111 may utilize a push notification service to push Tickets A, B and C to mobile devices A, B, and C, respectively (e.g., such as the push notification service 1050 illustrated FIGS. 11-12). One embodiment of the ticket data structure used for tickets A, B, and C is described above with respect to FIG. 3.

At 232, mobile device A 120 communicates with NAT traversal service 290 to determine its own connection data. In one embodiment, this can include a standard ICE connection data transaction. As previously mentioned, the connection data may include public/private IP address, port and NAT type for mobile device A 120.

Mobile device A 120 appends its connection data to Ticket A and, at 233, transmits Ticket A with the connection data to the CDX service 110. In one embodiment, the CDX service 110 processes Ticket A as described above and, at 234, transmits the connection data (which may be encrypted) to mobile device B 121 and mobile device C 122. For these transactions, the CDX service 110 can utilize the NAT traversal data for mobile devices B and C included with Ticket A.

At 236-238, a set of transactions corresponding to transactions 232-234 are performed using Ticket B and at 238-240 a set of transactions corresponding to transactions 232-234 are performed for Ticket C. Thus, following transaction 240, connection data has been shared between each of the mobile devices 120-122. Using the connection data, P2P sessions are established between mobile devices A and B, mobile devices A and C, and mobile devices A and C.

Figure 2C:
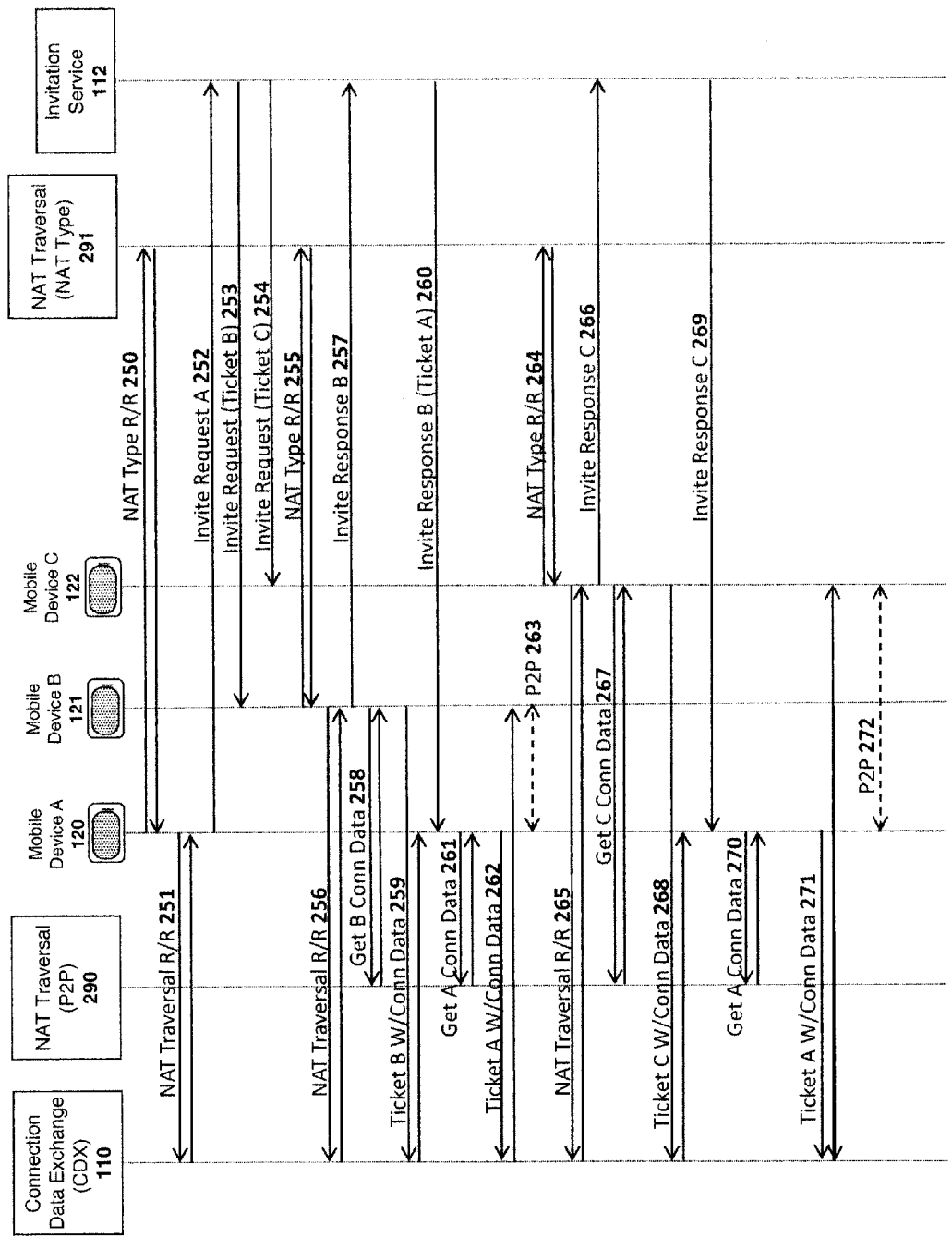

As illustrated in FIG. 2c, an invitation service 112 can also be used with the CDX service 110 (either in lieu of or in addition to the matchmaker service 111). In one embodiment, the invitation service 112 processes invitation requests for P2P connections with specific mobile devices and/or users. The invitation service 112 can be implemented as a stateless service (i.e., a service which does not tack the current state of transactions between each of the wireless devices).

Turning to this particular example, at 250, mobile device A 120 transmits a NAT type request to the NAT traversal service 291. In response, the NAT traversal service 291 may use various known techniques for determining the NAT type used by mobile device A (some of which are described above). At 251, mobile device A 120 initiates a NAT traversal request with the CDX service 110. In response, the CDX service 110 can read the public IP address and public port number used for the request and transmits this information back to mobile device A 120. As described above, if a device is behind a NAT, its public port and IP address will be different from its private port and IP address, respectively. Thus, depending on the type of NAT being used, the public IP address and port may be used to "punch a hole" through the NAT device to reach the mobile device.

As with the matchmaker service, in one embodiment, each of the mobile devices communicate with the invitation service 112 using Hypertext Transfer Protocol Secure ("HTTPS") sessions (e.g., using HTTPS request/response transactions).

At 252, mobile device A 120 transmits an invitation request to the invitation service 112 which includes mobile device A's NAT traversal data (e.g., NAT type, public IP address/port). In an embodiment which utilizes a push notification service (described in greater detail below), the invitation request may also include mobile device A's push token. The invitation request 252 can also include an identification code identifying one or more other users/devices—in this case the users of mobile devices B 121 and C 122. Various different identification code types may be used. For example, in the case of a multi-player game, the identification codes may comprise game-specific player ID codes. In the case of an audio/video chat session, the identification codes may comprise phone numbers or unique ID codes identifying one or more users from the user of mobile device A's "buddy" list.

In one embodiment, the invitation service 112 reads the identification codes from the invitation request and performs a lookup in a registration database (not shown) to locate each of the mobile devices B and C. In one particular embodiment, each of the mobile devices B and C has previously registered with a push service to receive push notifications from the invitation service 112. As such, in this embodiment, the invitation service 112 uses the push notification service to push the invitation requests to mobile device B 121 and mobile device C 122 at 253 and 254, respectively. Additional details related to a push notification service are described below (see, e.g., FIGS. 11-12 and associated text) and in the Push Notification Application referenced above.

In one embodiment, the invitation requests 253 and 254 include the ticket data structure illustrated in FIG. 3 and described above with respect to FIGS. 2a-b. Specifically, the ticket sent to mobile device B includes an encrypted list identifying mobile devices A and B and the ticket sent to mobile device C includes an encrypted list identifying mobile devices A and C. In one embodiment, because the invitation service 112 may not yet have mobile device B's NAT traversal data, the "ticket" at 253 may include other information identifying mobile device B. For example, as set forth below with respect to embodiments which utilize the relay service and push notification service (see, e.g., FIGS. 11-12), the "ticket" at 253 may include the NAT traversal data for mobile device A, device A's ID code, device A's push token, device B's ID code, and the push token for mobile device B. The same types of information may be provided at 254 for mobile devices A and C.

At 255, mobile device B may communicate with NAT traversal service 291 to determine its NAT type and, at 256, mobile device B may communicate with the CDX service 110 to determine its NAT traversal data (e.g., public IP address/port). At 257, mobile device B transmits an invitation response to the invitation service 112 containing mobile device A's and mobile device B's identification code, NAT traversal data and, if the push notification service is used, push tokens for mobile devices A and B. At 258, mobile device B can retrieve its current connection data by communicating with NAT traversal service 290. At 259, mobile device B transmits its ticket (Ticket B) with its current connection data to the CDX service 110. In response, the CDX service 110 processes the ticket as described above and forwards the connection data to mobile device A 120.

Upon receipt of mobile device B's invitation response, the invitation service 112 can generate an encrypted ticket for mobile device A and transmit the ticket to mobile device A at 260. In one embodiment, the ticket includes NAT traversal data, NAT type and push token (if the push notification service is used) for mobile devices A and B. The "tickets" described with respect to FIG. 2c may be the same or different from the data structures for "tickets" described with respect to the matchmaker service 111. For example, rather than generating an encrypted "ticket" as described above, the invitation service 112 may simply generate a unique session ID to identify the invitation session with each of the mobile devices.

At 261, mobile device A retrieves its current connection data by communicating with NAT traversal service 290. Mobile device A may then append its connection data to the ticket and, at 262, transmit the ticket with its connection data to the CDX service 110. The CDX service 110 processes the ticket as described above and forwards mobile device A's connection data to mobile device B. Finally, at 263, mobile devices A and B use the exchanged connection data to open a direct P2P connection. As described below, in cases where mobile device A's and B's NAT types are incompatible, a relay service may be used to enable communication between mobile devices A and B.

At 264-272, mobile device C 122 and mobile device A can execute a series of transactions to establish a P2P connection as described at 255-263 for mobile devices B and A. Specifically, at 624, mobile device C 122 communicates with NAT traversal service 291 to determine its NAT type and, at 265, communicates with the CDX service 110 to determine its NAT traversal data (e.g., public IP address/port). At 266, mobile device C transmits an invitation response containing mobile device C's and mobile device A's NAT type, NAT traversal data and push token (if the push notification service is used). At 267, mobile device C retrieves its current connection data through the NAT traversal P2P service 290 and, at 268, mobile device C appends its connection data to Ticket C and transmits Ticket C to the CDX service 110. The CDX service 110 processes the ticket as described above and forwards mobile device C's connection data to mobile device A 120.

At 269, mobile device A 120 receives mobile device C's invitation response from the invitation service 112 which includes both mobile device A's and C's NAT type, NAT traversal data and push tokens (if the push service is used). At 270, mobile device A retrieves its current connection data from the NAT traversal service 290, appends its current connection data to Ticket A and, at 271, transmits Ticket A to the CDX service 110. Alternatively, transaction 270 may not be required because mobile device determined its connection data at transaction 261. The CDX service 110 processes Ticket A as described above and forwards mobile device A's connection data to mobile device C. Finally, at 272, mobile device A and C use the exchanged connection data to establish a direct, P2P connection 272.

In one embodiment, the invitation service 112 and the matchmaker service 111 can rely on a push notification service (not shown) for pushing data to mobile devices. For example, in FIG. 2c, invitation requests 253 and 254 may be pushed to the mobile devices B 121 and C 122 via the push notification service. Similarly, in FIG. 2a, tickets A and B may be pushed to mobile devices A 120 and B 121. In one embodiment, when a mobile device is activated on the network, it registers its push token in a central registration directory accessible by the push notification service. In one embodiment, the registration directory associates a password protected user ID or a telephone number with a push token. If the push token can be identified in the directory, the push notification service can use the push token to transmit push notifications to the mobile device. In one embodiment, the push notification service is the Apple Push Notification Service ("APNS") designed by the assignee of the present application and described, for example, in the Push Notification Application referenced above. It should be noted however, that a push notification service is not required by the embodiments of the invention shown in FIGS. 2a-c. For example, push notifications are not required for the CDX service 110 to perform its operations as described herein.

Figure 4:
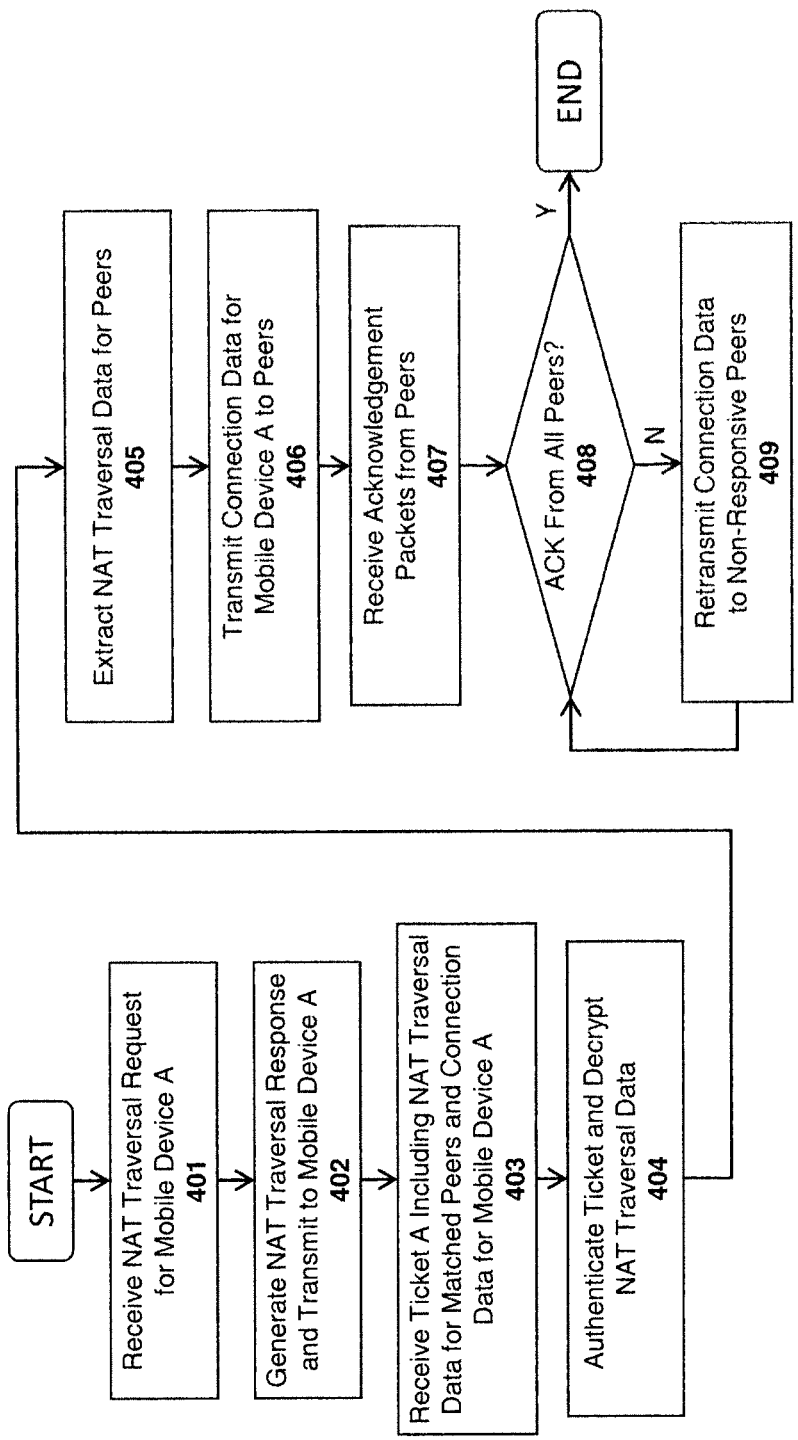
FIG. 4 illustrates one embodiment of a method implemented by a CDX service.
Figure 5:
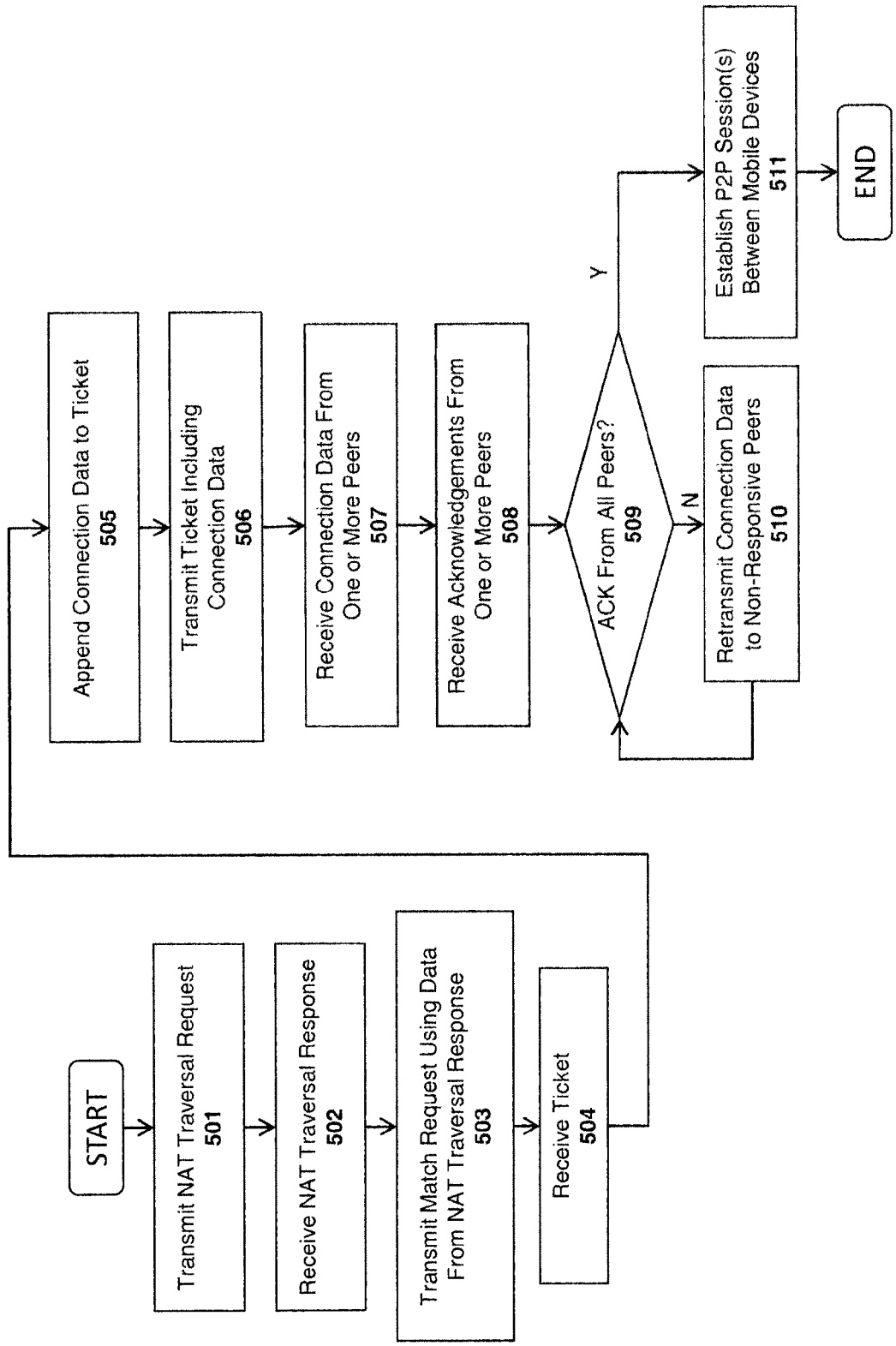
FIG. 5 illustrates one embodiment of a method implemented by a mobile device.

FIG. 4 illustrates a method which can be implemented by a CDX service 110 to exchange connection data and FIG. 5 illustrates a method which may be implemented by a mobile device to exchange connection data and establish a P2P connection. Certain aspects of these methods have already been described above with respect to FIGS. 1-2c. In particular, these methods may be implemented within the context of the network architecture shown in FIGS. 1-2c but they are not limited to such an architecture. In one embodiment, the methods are embodied in program code which, when executed by a processor, causes the operations of the methods to be performed. The program code may be stored in a machine-readable medium such as a random access memory ("RAM") while being executed by the processor. The processor may be a general purpose processor (e.g., an Intel® Core™ processor) or a special purpose processor. However, the methods may be implemented using any combination of hardware, software, and firmware. In addition, the program code may be stored on a non-volatile storage device such as a hard disk drive, optical disc (e.g., a Digital Video Disk or Compact Disc) or a non-volatile memory such as Flash memory device.

Turning now to the method shown in FIG. 4, at 401, a NAT traversal request (also sometimes referred to as a "hole punch" request) is received for a particular mobile device— "mobile device A" in the example. At 402, a NAT traversal response is generated and transmitted to mobile device A. In one embodiment, generating the NAT traversal response can include determining the current public IP address/port and/or NAT type of mobile device A.

A ticket for mobile device A may subsequently be generated and encrypted by a ticket-generation entity such as the matchmaker service 111 or invitation service 112 described above. At 403, the ticket generated for mobile device A ("Ticket A") is received which includes NAT traversal data (for device A and one or more other devices) and connection data for device A. At 404, the ticket is authenticated using the message authentication code and the hole punch data is decrypted using the same CDX ticket key as that used by the ticket-generation entity to encrypt the ticket. As mentioned above, in one embodiment, the correct CDX ticket key is identified using an expiration time/date associated with the CDX ticket key.

At 405, the NAT traversal data for the mobile devices is extracted. At 406, the connection data for mobile device A is transmitted to each of the peers using the NAT traversal data. At 407 acknowledgements are received from each of the peers. If acknowledgements have not been received from all of the peers, determined at 408, then mobile device A's connection data is retransmitted to those peers which have not responded at 409. When all of the connection data has been acknowledged, determined at 408, the method terminates.

In one embodiment, the method shown in FIG. 4 can be performed for each of the peers involved in the P2P transaction to ensure that each peer receives the connection data required to establish a P2P connection.

FIG. 5 illustrates a method which can be performed by a mobile device in accordance with the embodiments of the invention described herein. At 501, a NAT traversal request is transmitted and, at 502, a NAT traversal response is received. As previously described, the NAT traversal data contained in the response may include the public port/IP address of the requesting device. At 503, a match request is transmitted which contains the NAT traversal data. A ticket for the mobile device may subsequently be generated and encrypted by a ticket-generation entity such as the matchmaker service 111 or invitation service 112 described above. As an alternative to the ticket data structure described above, the matchmaker service 111 and/or the invitation service 112 may simply identify each of the participants using a unique session ID.

At 504, the ticket may be received; at 505, connection data for the mobile device is appended to the ticket; and, at 506, the ticket with the connection data is transmitted. At 507, connection data needed to establish P2P connections with one or more other peers is received. At 508, acknowledgements indicating that one or more other wireless devices have received the connection data transmitted at 506 are received. If all acknowledgements are not received then, at 510, the connection data is retransmitted to those mobile devices from which acknowledgements have not been received. If all acknowledgements are received, determined at 509, then the connection data received at 507 is used to establish P2P sessions with the other mobile devices.

Apparatus and Method for Establishing and Utilizing Backup Communication Channels Current mobile devices are capable of communicating over a variety of different communication channels. For example, the Apple iPhone™ is capable of communicating over Wi-Fi networks (e.g., 802.11b, g, n networks); 3G networks (e.g., Universal Mobile Telecommunications System ("UMTS") networks, High-Speed Uplink Packet Access ("HSUPA") networks, etc); and Bluetooth networks (known as personal area networks ("PANs")). Future mobile devices will be capable of communicating over additional communication channels such as WiMAX, International Mobile Telecommunication ("IMT") Advanced, and Long Term Evolution ("LTE") Advanced, to name a few.

In operation, current mobile devices select one primary communication channel from among a set of available channels. For example, mobile devices are often configured to choose a Wi-Fi connection if one is available and to choose a cellular data connection (e.g., a UTMS connection) if Wi-Fi is not available.

In one embodiment of the invention, a group of mobile devices initially establish primary peer-to-peer ("P2P") communication channels using standard ICE connection data exchanges and/or using the connection data exchange techniques described above. The mobile devices may then exchange connection data over the primary channels to establish one or more secondary communication channels which are used as backup channels if any of the primary channels fail. In one embodiment, the secondary communication channels are maintained open through NAT firewalls by periodically transmitting "heartbeat" packets over these channels.

As used herein, a communication "channel" refers to the full network path between two mobile devices and a communication "link" refers to one particular connection used in the communication path. For example, if device A is connected to the Internet using a Wi-Fi connection and device B is connected to the Internet using a 3G connection, then the "channel" between device A and device B is defined by both the Wi-Fi link and the 3G link; device A has a Wi-Fi communication "link;" and device B has a 3 G communication "link." As such, if device A switches from a Wi-Fi link to a 3G link, then the "channel" between device A and device B is changed notwithstanding the fact that device B's 3G link remains the same.

Specific examples in which mobile devices establish primary and secondary communication channels will now be described with respect to FIG. 6. It should be noted, however, that the underlying principles of the invention are not limited to the particular set of communication links and communication channels shown in FIG. 6.

Figure 6:
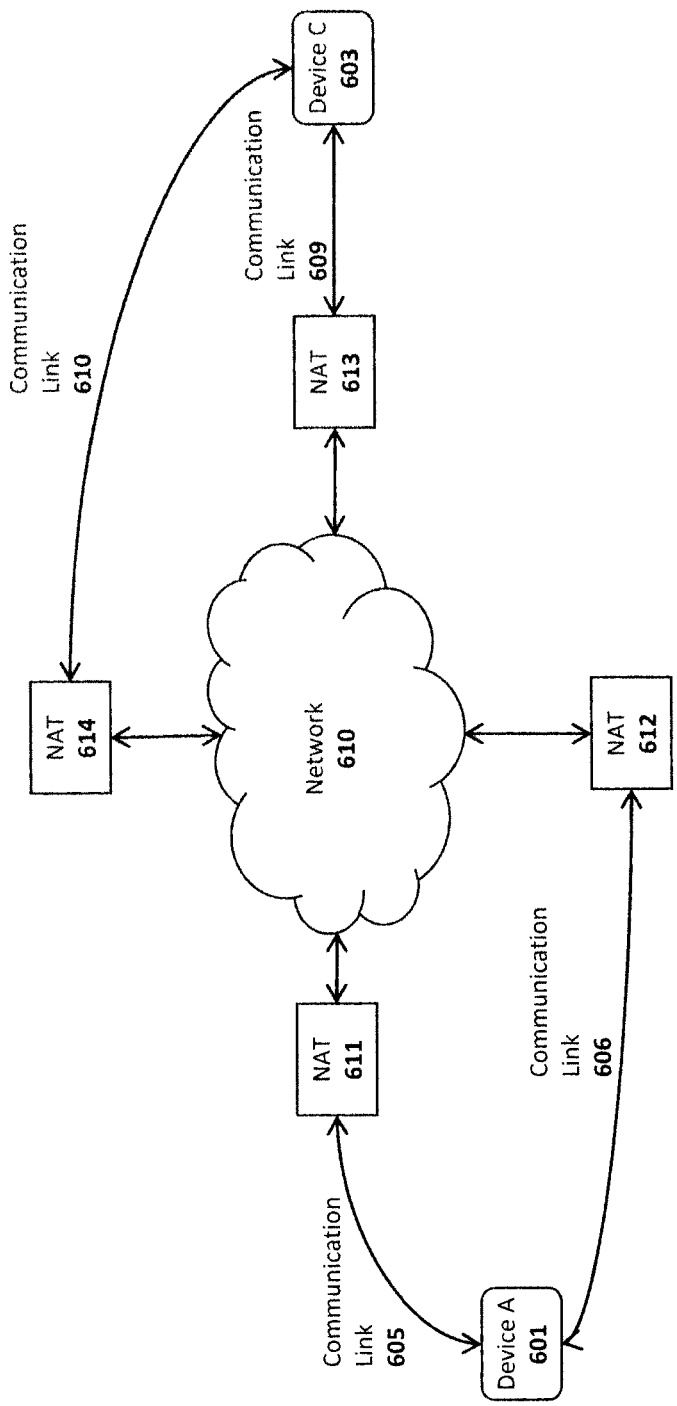
FIG. 6 illustrates a group of mobile devices connected through primary and secondary communication channels.

In FIG. 6, mobile device A 601 is capable of connecting to a network 610 (e.g., the Internet) over communication link 605 with NAT device 611 and over communication link 606 with NAT device 612. Similarly, device C 603 is capable of connecting to the network 610 over communication link 609 with NAT device 613 and over communication link 610 with NAT device 613. By way of example, and not limitation, communication links 605 and 609 may be 3 G communication links and communication links 606 and 610 may be Wi-Fi communication links.

Consequently, in this example, there are four different communication channels which may be established between mobile device A and mobile device B: a first channel which uses links 605 and 609; a second channel which uses links 605 and 610; a third channel which uses links 606 and 609; and a third channel which uses links 606 and 610. In one embodiment, mobile devices A and B will select one of these channels as the primary communication channel based on a prioritization scheme and will select the three remaining channels as backup communication channels. For example, one prioritization scheme may be to select the channel with the highest bandwidth as the primary channel and to use the remaining channels as the secondary channels. If two or more channels have comparable bandwidth, the prioritization scheme may include selecting the least expensive channel (assuming that the user pays a fee to use one or more of the channels). Alternatively, the prioritization scheme may be to select the least expensive channel as the primary channel and, if the cost of each channel is the same, to select the highest bandwidth channel. Various different prioritization schemes may be implemented while still complying with the underlying principles of the invention.

Mobile devices A 601 and C 603 may utilize the techniques described above to establish the primary communication channel (e.g., by exchanging connection data via the CDX service 110). Alternatively, the mobile devices 601, 603 may implement standard Internet Connectivity Establishment ("ICE") transactions to exchange the connection data. Regardless of how the primary channel is established, once it is, the mobile devices A 601 and C 603 may exchange connection data for the secondary communication channels over the primary communication channel. For example, if the primary communication channel in FIG. 6 includes communication link 606 and communication link 609, then this connection, once established may be used to exchange connection data for secondary communication channels which include communication links 605 and 609. In this example, the connection data exchanged over the primary communication channel may include NAT traversal data and NAT type data for NAT 611 and NAT 613, including public and private IP addresses/ports for each of the mobile devices.

Once the secondary communication channels have been established, they are maintained open using heartbeat packets. For example, device A may periodically transmit a small "heartbeat" packet to device C and/or device A may periodically transmit a small "heartbeat" packet to device C to ensure that the NAT ports used for the secondary channels remain open (NATs will often close ports due to inactivity). The heartbeat packets may be UDP packets with no payload, although the underlying principles of the invention are not limited to any particular packet format. The heartbeat packets may be UDP packets with a self-identifying type field in their payload header, and may contain optional additionally-formatted information including but not limited to a channel time-to-live value.

Figure 7:
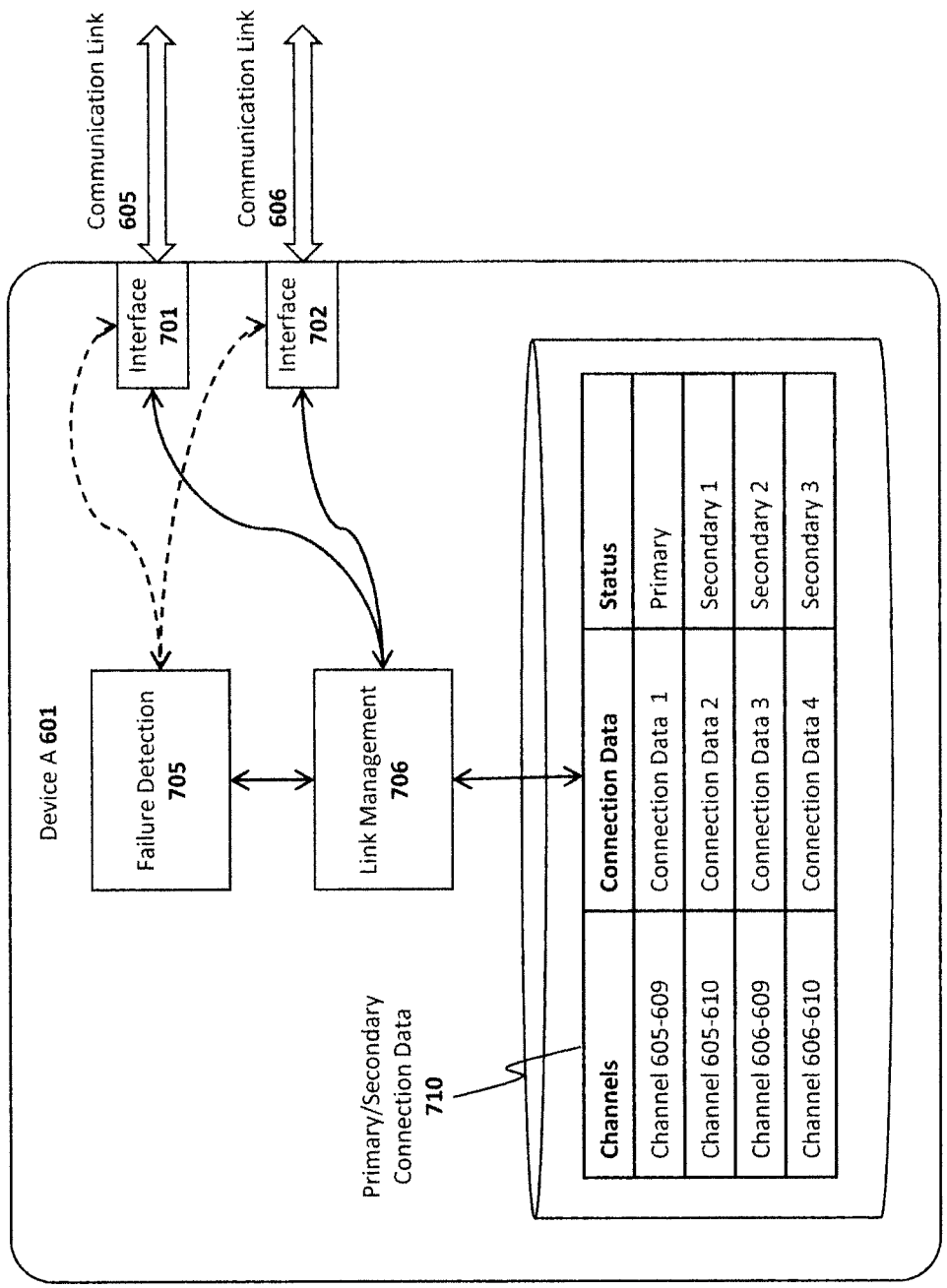
FIG. 7 illustrates one embodiment of a mobile device for selecting among primary and secondary communication channels

As illustrated in FIG. 7, each mobile device 601 stores and maintains a data structure 710 (e.g., a table, text file, database, etc) containing a list of primary and secondary communication channels. A separate entry is provided for each communication channel and includes the connection data needed to utilize that channel (e.g., private/public IP address, NAT type, etc), and the current status of that channel (e.g., primary, secondary 1, secondary 2, etc).

In one embodiment, communication interfaces 701 and 702 are used for communicating over communication link 605 and communication link 606, respectively. A failure detection module 705 can be executed on the mobile device 601 to detect when a particular communication interface/link has failed or has degraded below a specified threshold. In response, a link management module 706 can read the primary/secondary connection data 710 to promote a secondary channel having the next highest priority to the primary channel. The prioritization of the secondary channels may be accomplished using the same principles as those discussed above for the primary channels (e.g., based on bandwidth, cost, reliability, etc). Once a secondary channel has been selected, the link management module 706 can transmit a link failure indication to link management modules on the other mobile devices, instructing those devices to promote the secondary communication channel to a primary communication channel. Those devices will then begin using the connection data associated with the selected primary channel.

In one embodiment, a complete "failure" of the primary communication channel is not required to force a switch to one of the secondary communication channels. For example, in one embodiment, if the primary communication channel is sufficiently degraded (e.g., below a particular bandwidth, bitrate, or reliability threshold), then a change to a secondary channel may be implemented as described herein. In one embodiment, the switch to the secondary channel is only performed if the secondary channel is capable of supporting better performance (e.g., bandwidth, bitrate or reliability) than the current primary channel.

Figure 8A:
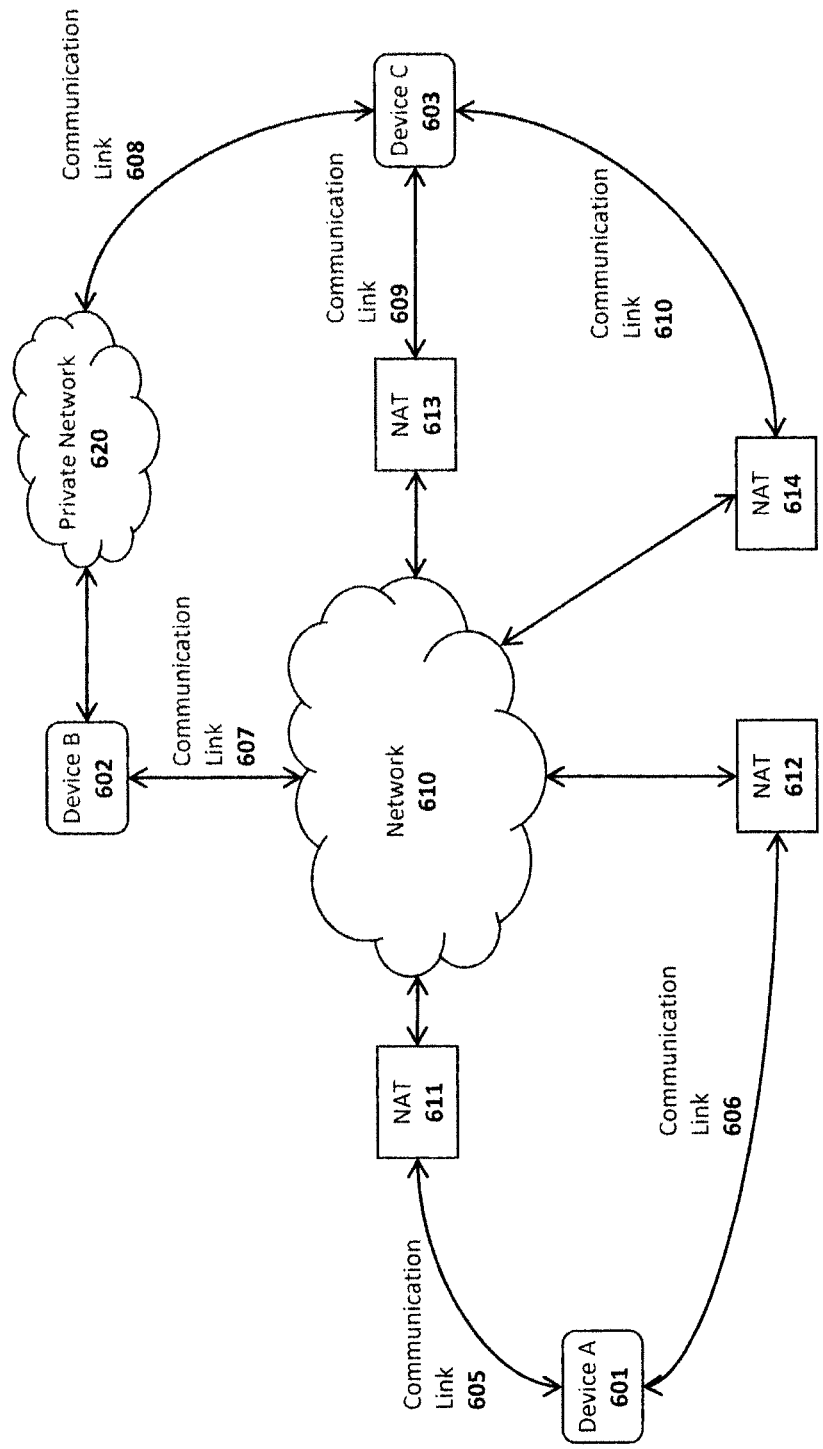
FIGS. 8a-b illustrate a group of mobile devices connected through primary and secondary communication channels and the resulting network topologies.
Figure 8B:
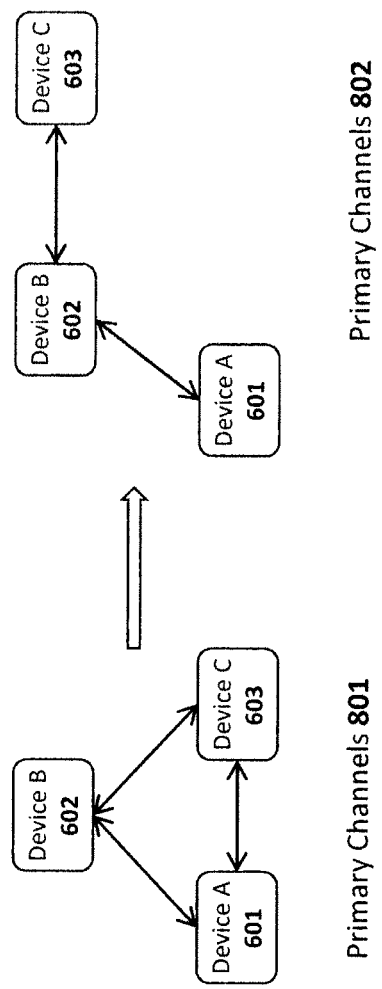
Figure 9:
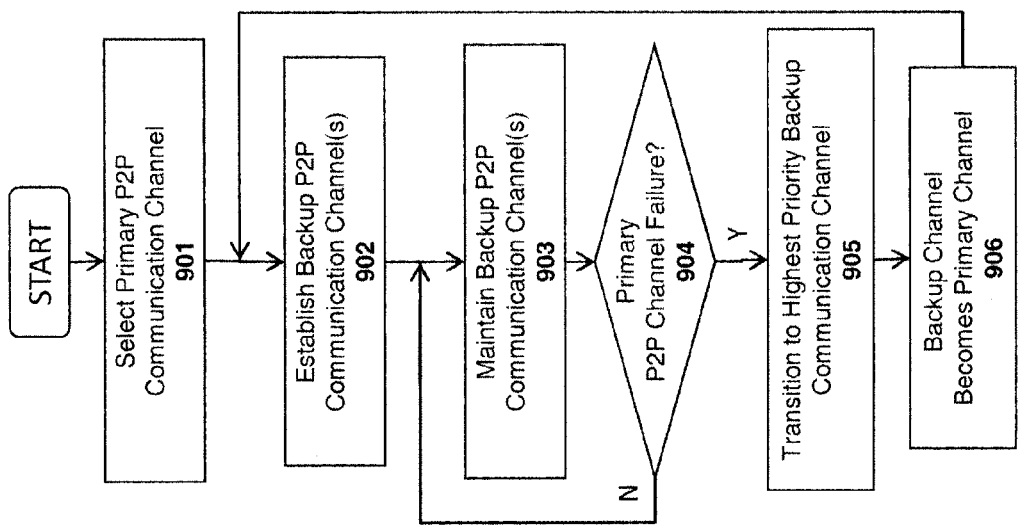
FIG. 9 illustrates one embodiment of a computer-implemented method for selecting between primary and secondary communication channels.

FIG. 8a illustrates the same network configuration as shown in FIG. 6 with the addition of mobile device B 602 connected directly to the network 610 and connected to device C 603 through a private network connection 620. The private network 620 may be, for example, a Bluetooth PAN connection between device B 602 and device C 603. It can be seen from this example that switching from a primary channel to a secondary channel may dramatically alter the network topology. For example, as shown in FIG. 8b, if the primary channels 801 for the mobile devices include communication link 609 (resulting in direct connections between device devices A, B and C) and the secondary channels include the private network 620, then the network topology may change as illustrated in FIG. 8c because the only way for device A and device C to communicate using the private network is through device B. While this is a simplified example with only three devices, a significantly larger number of devices may be used, resulting in a variety of different network topology configurations when switching between primary and secondary communication channels.

One embodiment of a method for establishing and maintaining secondary channels is illustrated in FIG. 8. In one embodiment, the method may be executed by the link management module 706 on each mobile device. However, the method is not limited to any particular device configuration.

At 901, a primary P2P communication channel is selected. As mentioned above, the primary channel may be selected based on a predefined prioritization scheme. For example, certain communication channel types may be prioritized ahead of other communication channel types. Channels may also be prioritized based on variables such as bandwidth, cost for usage, and/or reliability.

At 902, backup P2P communication channels are established. In one embodiment, this is accomplished by sharing connection data between all of the mobile devices over the primary communication channel. At 903, the backup channels are maintained. In one embodiment, this involves transmitting data periodically over the secondary communication channels (e.g., in the form of periodic heartbeat packets).

At 904, if the primary P2P channel fails (e.g., because the communication link of a particular mobile device went down or the mobile device moved out of range of the communication link), then at 905, the mobile devices promote the highest priority backup channel to the primary channel. In one embodiment, this involves the mobile device with the failed link transmitting a notification of its link failure to the other devices over the secondary channel. Finally, at 906, the backup channel is made the primary channel and the process reverts to 902 (in which any additional backup channels are discovered and added to the prioritization scheme).

Figure 10:
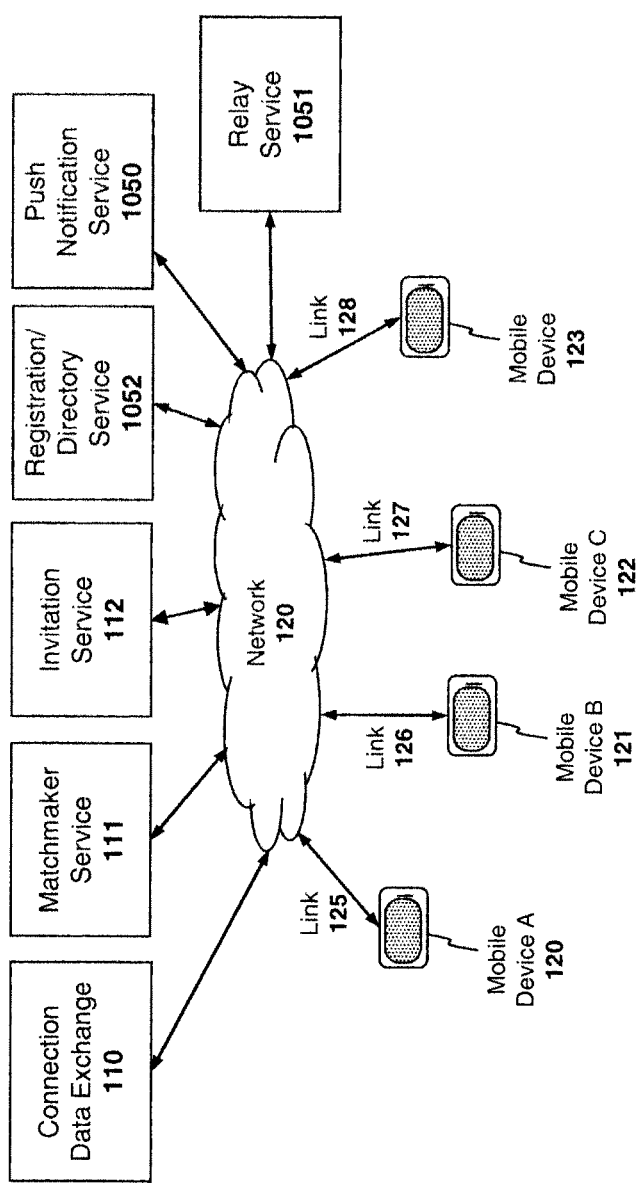
FIG. 10 illustrates a network architecture in which a group of mobile devices and services, including a directory service and a push notification service communicate over a network.

Apparatus and Method for an Invitation Service for Establishing Peer-to-Peer (P2P) Communication Channels As illustrated in FIG. 10, in addition to the CDX service 110, matchmaker service 111 and invitation service 112 (some embodiments of which are described above), one embodiment of the invention can include a registration/directory service 1052, a push notification service 1050, and a relay service 1051. As mentioned above, in one embodiment, the invitation service 112 and/or the matchmaker service 111 can use the registration/directory service 1052 to identify registered mobile devices and the push notification service 1050 to push data to the mobile devices. In one embodiment, when a mobile device is activated on the network, it registers a "push token" (sometimes referred to as a "notification service account identifier" in the Push Notification Application) with a database maintained by the registration/directory service 1052 by associating the push token with a password protected user ID or a telephone number. If the push token is identified in the registration directory (e.g., by performing a query with the user ID), the push notification service 1050 can use the push token to transmit push notifications to a mobile device. In one embodiment, the push notification service is the Apple Push Notification Service ("APNS") designed by the assignee of the present application and described, for example, in the Push Notification Application referenced above.

Figure 11:
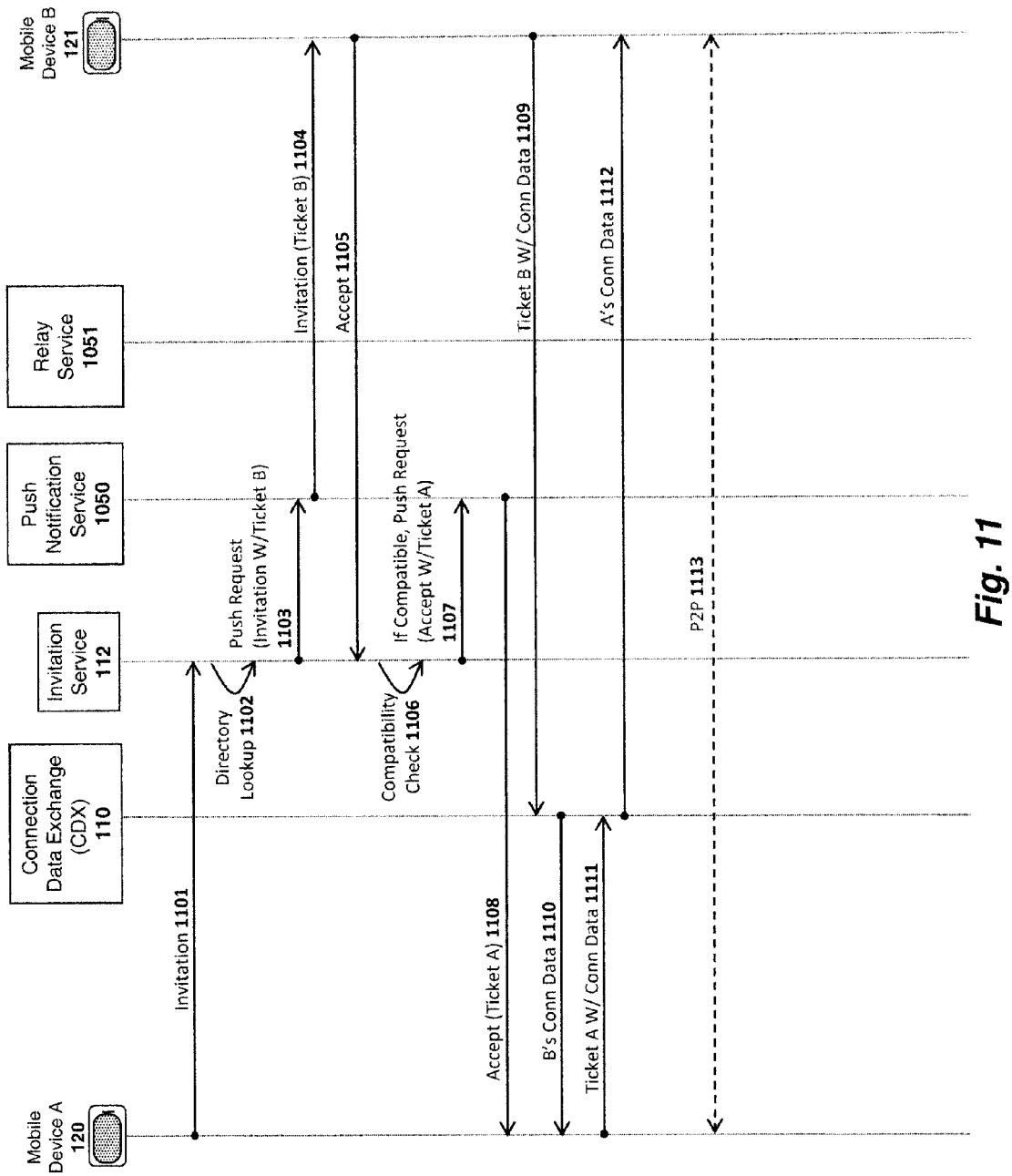
FIG. 11 illustrates transactions between one embodiment of an invitation service, a push notification service and a connection data exchange (CDX) service.
Figure 12:
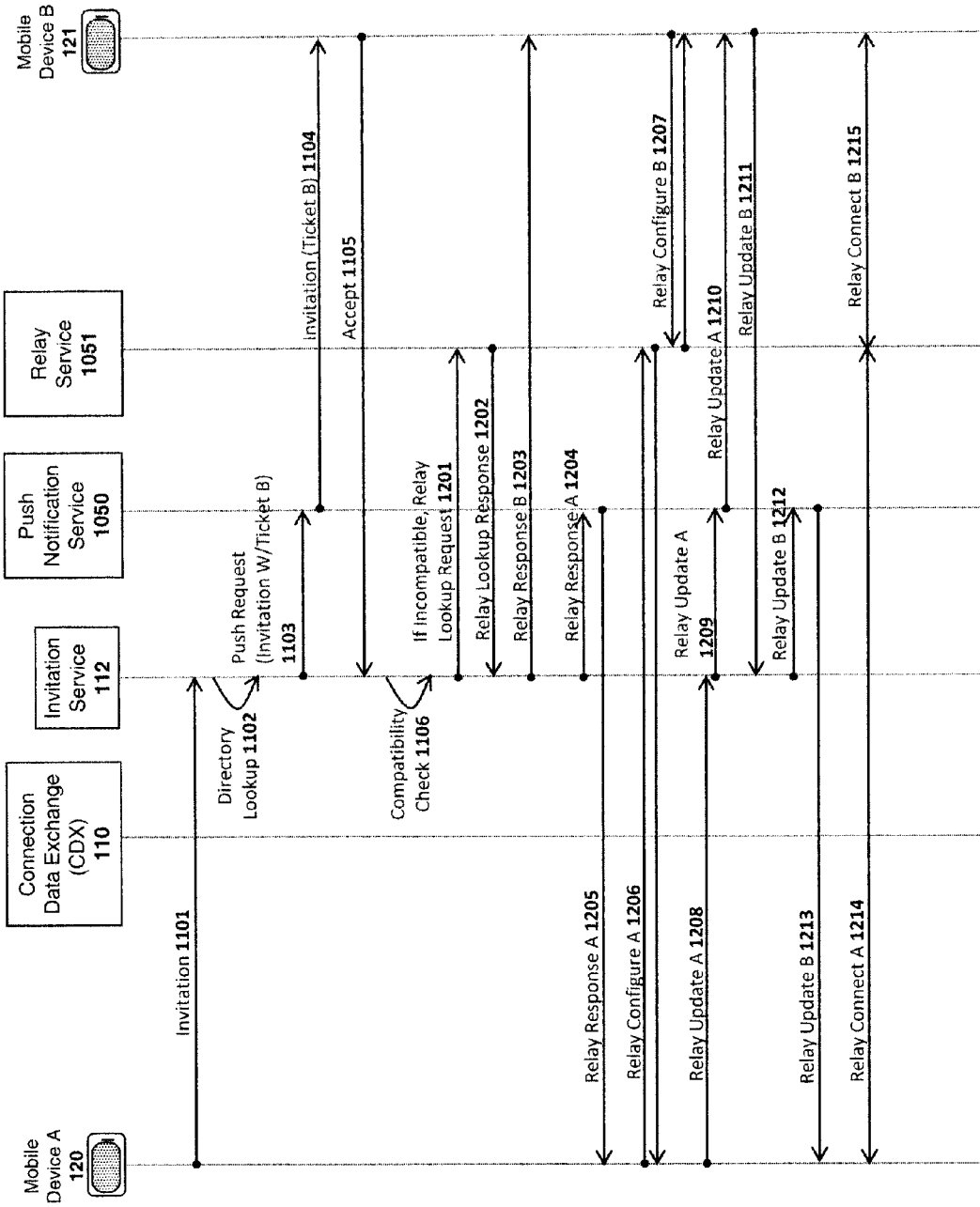
FIG. 12 illustrates transactions between one embodiment of an invitation service, a push notification service, and a relay service.

FIG. 11 illustrates an embodiment of the invention in which the push notification service 1051 is used to establish a direct P2P connection between two mobile devices and FIG. 12 illustrates an embodiment which is used to establish a P2P connection through the relay service 1051. As described below, the decision as to whether to use the relay service 1051 to establish a P2P connection may be based on the feasibility of establishing a direct P2P connection between the mobile devices (e.g., based on NAT compatibility issues).

Turning now to FIG. 11, at 1101, mobile device A 120 transmits an invitation to invite mobile device B 121 to invite mobile device B to a P2P communication session (e.g., a collaborative video game, a P2P video chat, etc). In one embodiment, the invitation includes a User ID code identifying mobile device B 121 (and/or the user of mobile device B) within the context of a particular online application. For example, the user ID code may be a player ID for a particular multi-player, P2P game and may take the form, for example, of a Universally Unique Identifier (UUID). Alternatively, in some embodiments, the ID code may be a phone number of mobile device B 121. A game ID code may be used to identify the multi-player game that mobile device A is inviting mobile device B to join. A bucket ID may be used to identify a configuration for that game (as described herein with respect to the matchmaker service).

The invitation 1101 may also include an ID code identifying mobile device A 120 and NAT traversal/connection data associated with mobile device A (e.g., the public/private IP addresses and ports for mobile device A and the NAT type for device A's NAT device). The NAT traversal/connection data or NAT type data may have been previously determined by mobile device A prior to the invitation request 1101 (e.g., via NAT traversal, NAT type and connection data transactions such as those discussed above with respect to FIGS. 2a-c). As previously mentioned, the invitation request 1101 can take the form of an HTTPS request. In addition, for additional security, the invitation request 1101 can include a client certificate signed by a pre-specified certificate authority.

Regardless of the particular type of ID code used to identify mobile device B, the ID code is received by the invitation service 112 and, at 1102, the invitation service 112 can perform a lookup in the directory service 1052 (not shown in FIG. 11) to identify a notification service account identifier such as a push token used for pushing notifications to mobile device B ("push-token-B"). In one embodiment, the lookup operations can perform several checks to determine whether the invitation should be allowed. First, it can confirm that the identification code for mobile device A ("ID-A") and device A's push token ("push-token-A") are a registered association within the directory service database. The lookup operation 1102 can also confirm that that the user of mobile device A is permitted to invite the user of mobile device B (e.g., the user of mobile device B can specify that only those other users registered as B's friends can invite user B; or can specify that no invitations are permitted). In one embodiment, if any of these checks fail, the invitation is canceled, and the invitation service 112 returns an error to mobile device A.

While a "push token" is described in this embodiment, it should be noted that the underlying principles of the invention are not limited to the use of a "push token" or any other particular data structure for authenticating and pushing notifications to mobile devices.

In one embodiment, after the push token has been identified, the invitation service 112 can generate a secure, one-time "session token" assigned to the invitation session and used to identify the session in all further transactions. A copy of the session token is then transmitted back to the mobile device A 120 and sent to mobile device B with the invitation request. In one embodiment, the session token is used together with the ticket data structure described above and, in another embodiment, only the session token is used.

At 1103, the invitation service 112 transmits a push request to the push notification service 1050. In one embodiment, the push request can include the NAT traversal data for mobile device A, device A's ID code, push-token-A, device B's ID code, and push-token-B. In one embodiment, this information may be packaged within a "ticket" data structure and encrypted as described above. In another embodiment, the data is simply transmitted with the invitation session ID.

Because mobile device B 121 in this example has registered with the push notification service 1050, the push notification service 1050 is capable of locating and pushing the invitation request to mobile device B 121 at 1104. The pushed invitation 1104 may include the session token, mobile device A's NAT traversal data/connection data, and mobile device B's ID code. In response to the invitation request, mobile device B may determine its networking information (e.g., NAT traversal/connection data, NAT type, etc) by making a call to a NAT traversal service or the CDX service 110 as described above.

At 1105, mobile device B accepts the invitation. The accept 1105 may take the form of an HTTPS call to the invitation service 112 and may include a client certificate signed by the pre-specified certificate authority (mentioned above with respect to the invitation request). In one embodiment, the accept 1105 can include the ID code for mobile devices A and B and the NAT traversal/connection data and/or NAT type for mobile devices A and B. The accept 1105 may also include the push tokens for mobile devices A and B and/or the session token. In one embodiment, the accept 1105 may also contain an indication as to whether it is a retry from a previous failed direct connection attempt. However, in another embodiment, the accept 1105 does not contain the retry indication. Rather, upon detecting a failed P2P connection attempt, one of the two mobile devices may transmit a special "relay invitation" to the invitation service 112. In response, the service may directly initiate the series of relay transactions described below with respect to FIG. 12 (starting at 1201).

At 1106, the invitation service 112 can perform a compatibility check to determine whether a direct P2P connection between mobile devices A and B is feasible. For example, in one embodiment, if the accept 1105 received from mobile device B indicates that it is a retry from a previous failed direct connection attempt (or a specified number of previous failed direct connection attempts), then the invitation service may conclude that a direct P2P connection is infeasible. The invitation service 112 may compare the NAT type data for mobile devices A and B to determine if the NAT devices of mobile devices A and B will support a direct P2P connection. Certain combinations of NAT types are known to be incompatible for establishing P2P connections. For example, a full cone NAT may be used with any other NAT type except a closed/firewalled NAT to establish a direct P2P connection. By contrast, a symmetric NAT can only be used with a full cone NAT to establish a direct P2P connection. The feasibility of combining various NAT types in one embodiment of the invention is set forth in the NAT compatibility table 1400 shown in FIG. 14, in which columns represent NAT types of one mobile device (e.g., mobile device A) and rows represent NAT types of the other mobile device (e.g., mobile device B). A "1.0" in a cell indicates that the NAT types in the associated row and column are compatible and a "0.0" indicates that the NAT types are incompatible.

In one embodiment, if the compatibility check 1106 determines that a direct P2P connection is infeasible, then the invitation service 112 can transmit a relay lookup request 1201 as described below with respect to FIG. 12. If, however, the compatibility check 1106 determines that a direct P2P connection is feasible, then the invitation service 112 can transmit a push request 1107 to the push notification service 1050 containing mobile device B's acceptance of mobile device A's invitation. The push request 1107 and subsequent push communication 1108 to mobile device A from the push notification service 1050 can include the session token and both mobile device A's and B's push token, ID code, and/or NAT traversal/connection data. In one embodiment, this information may be packed within the "ticket" data structure described above (see, e.g., FIGS. 2a-c and associated text) and may be encrypted using a unique key. Alternatively, this information may simply be transmitted with a unique invitation session ID. The invitation service 1050 may also notify mobile device B that a direct connection will be attempted.

At this stage, mobile devices A and B have sufficient information to establish a direct P2P connection. In one embodiment, this is accomplished using the CDX service 110 as described above. For example, mobile device B appends its connection data to Ticket B and, at 1109, transmits Ticket B (with connection data) to the CDX service. Just prior to this transaction, mobile device B may implement a transaction such as transaction 235 shown in FIG. 2b in order to ensure that its connection data is current. The CDX service 110 then authenticates the ticket (e.g., using the unique session key as described above), extracts mobile device B's connection data, and forwards the connection data to mobile device A at 1110. Similarly, mobile device A appends its connection data to Ticket A and, at 1111, transmits Ticket A (with connection data) to the CDX service 110. Just prior to this transaction, mobile device A may implement a transaction such as transaction 232 shown in FIG. 2b in order to ensure that its connection data is current. The CDX service 110 then authenticates the ticket (e.g., using the unique session key as described above), extracts mobile device A's connection data and forwards the connection data to mobile device B at 1112. Finally, at 1113, mobile devices A and B enter into a direct P2P connection using the exchanged connection data.

Figure 13:
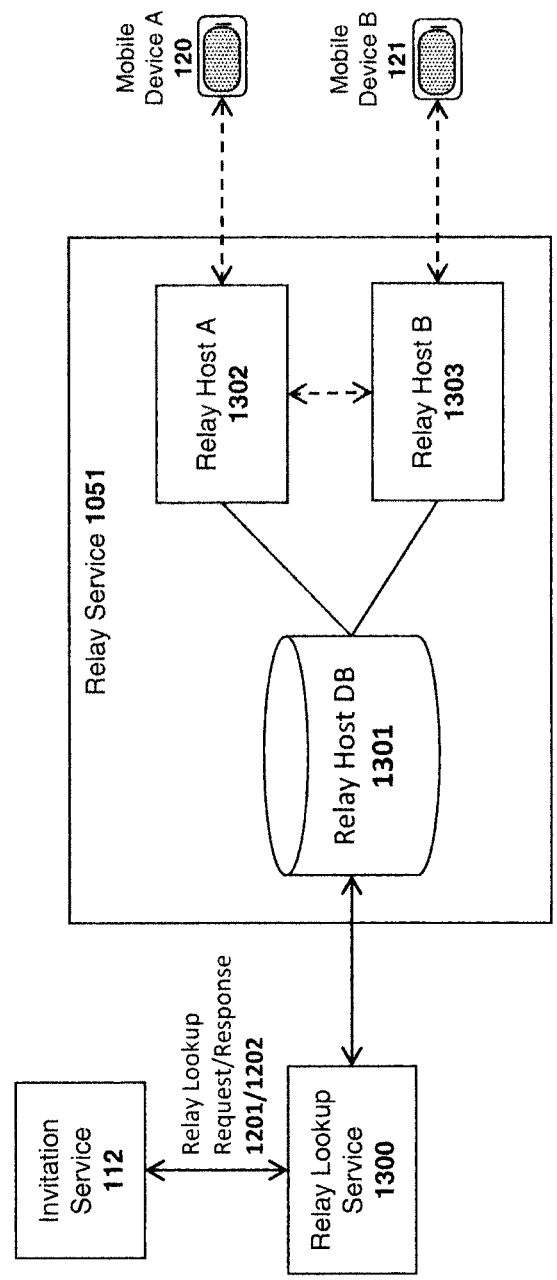
FIG. 13 illustrates one embodiment of a relay service for establishing a relay connection between two or more mobile devices.

Turning now to FIG. 12, if the compatibility check 1106 determines that a direct P2P connection is infeasible, then the invitation service 112 can transmit a relay lookup request 1201 to the relay service 1051 to determine a relay host to be used by each mobile device. The request 1201 may contain the networking information for mobile devices A and B (e.g., NAT traversal/connection data and/or NAT type data) which is used by the relay service 1051 to select appropriate relay hosts for both of the mobile devices. As illustrated in FIG. 13, one embodiment of the relay service 1051 includes a plurality of relay hosts 1302-1303 and a relay host database 1301 containing network information related to each of the relay hosts. The invitation service 112 transmits a relay lookup request 1201 to a relay lookup service 1300, which queries the relay host database 1301 using the network information for mobile devices A and B. Upon receiving the database results, the relay lookup service 1300 provides a response 1202 identifying the selected relay hosts 1302-1303.

In one embodiment, the relay lookup response 1202 contains a relay token generated by the relay service and the network addresses (IP addresses/ports) of the relay hosts 1302-1303 to be used by mobile devices A and B for the relay connection. In one embodiment, the relay token is associated with the relay session and is used by the relay hosts 1302-1303 to authenticate mobile devices A and B upon connecting to the relay service 1051. The token may take on various forms including, for example, unique ID relay session ID code, a digital certificate and/or a unique encryption key associated with the relay session.

At 1203, the invitation service transmits a relay response 1203 to mobile device B 121 containing an indication that a relay connection will be made. In one embodiment, the relay response 1203 can include the relay token and the network information for relay host B 1303. In one embodiment, response 1203 can be sent directly to mobile device B (by-passing the push notification service 1050) because it is being sent in response to mobile device B's accept 1105.

The invitation service 112 transmits relay response 1204 to mobile device A which can include the relay token and the network information for relay host B 1303. In this instance, the response 1204 is pushed to mobile device A via the push notification service 1050 at transaction 1205.

At 1206, mobile device A 120 uses the network information for relay host A 1302 to establish a connection with the relay service 1051. Similarly, at 1207, mobile device B 121 uses the network information for relay host B 1303 to establish a connection with the relay service 1051. In each of these transactions, new holes are opened in any NAT firewalls of mobile devices A and B and the NAT traversal/connection data for mobile devices A and B may be determined by the relay service 1051 and returned to mobile devices A and B, respectively (e.g., by determining the public IP/port for the devices). In one embodiment, the relay service 1051 and mobile devices A and B implement the Traversal Using Relay NAT ("TURN") protocol which, as understood by those of skill in the art, allows an element behind a NAT or firewall to receive incoming data over TCP or UDP connections.

At 1208, mobile device A transmits a relay update to the invitation service 112 which is forwarded to the push notification service at 1209 and pushed to mobile device B at 1210. Similarly, at 1211 mobile device B transmits a relay update to the invitation service 112 which is forwarded to the push notification service at 1212 and pushed to mobile device A at 1213. The relay update transmitted by mobile device A can include the session token, each device's ID code, and the NAT traversal/connection data determined by the relay at 1206 and 1207 (i.e., with mobile device A sending its NAT traversal/connection data to mobile device B and vice versa). In one embodiment, the relay update operations are performed because each mobile device's NAT information may change.

Finally, at 1214 and 1215 mobile devices A and B, respectively, establish a P2P connection through the relay service 1051. In one embodiment, the relay connections can be established when mobile device A sends the NAT traversal/connection data of mobile device B to the relay service 1051, and vice versa, thereby allowing the relay service to determine the correct path to each peer's relay host 1302-1303.

Using the techniques described above, the invitation service 112 may be implemented as a stateless service which is inherently scalable and resilient, even in a large-scale system with a vast number of mobile devices. For example, because the push notification service 1050 is inherently capable of locating and pushing content to registered mobile devices, the invitation service is not required to track the current location of each device. Additionally, because devices may transmit the entire session state data with each request and response, the invitation service is never required to maintain any per-connection state information, thereby reducing the storage and processing requirements of the invitation service. Such an implementation is particularly useful in a large-scale system.

System and Method for Matching Users for Online Sessions

Figure 15:
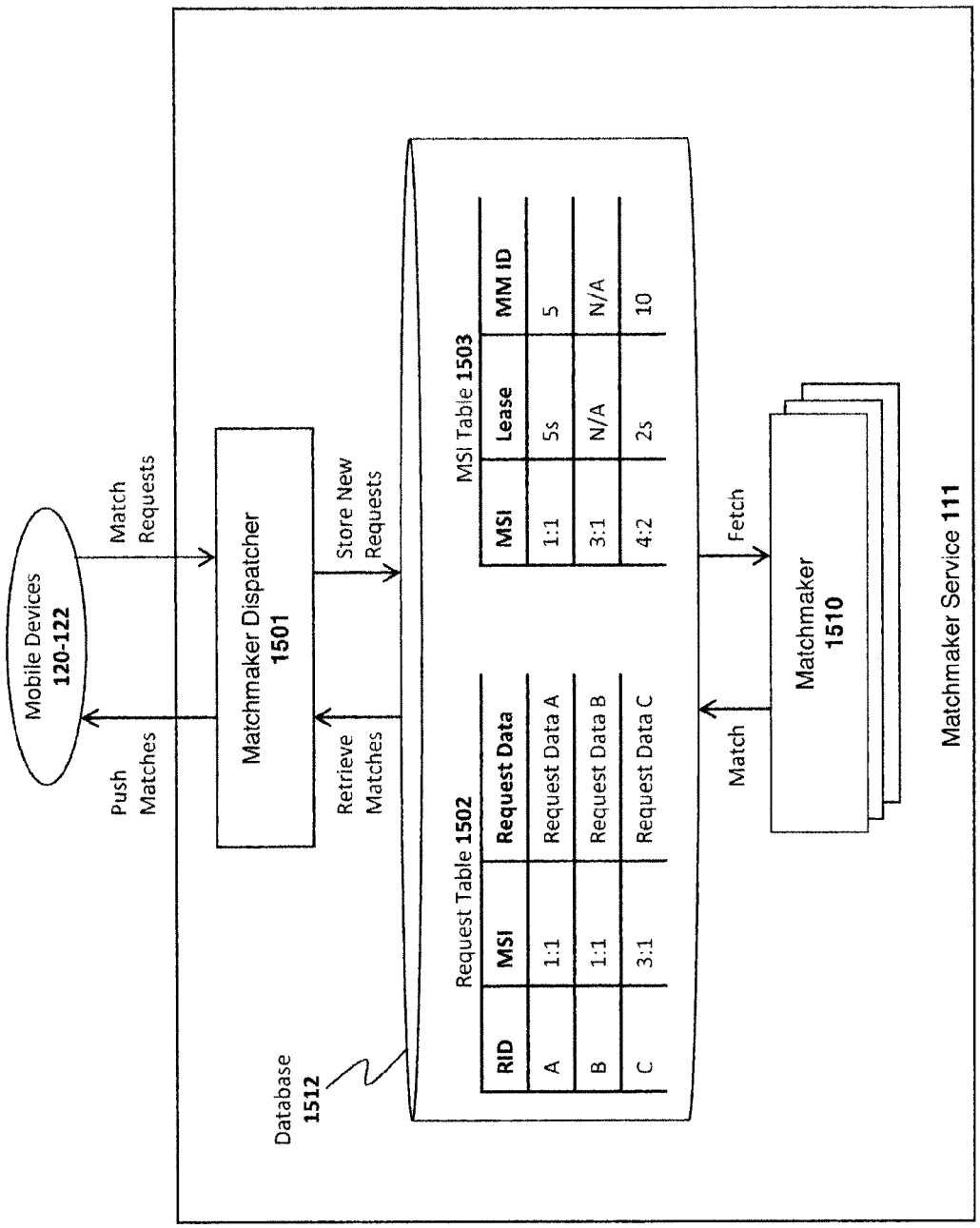
FIG. 15 illustrates one embodiment of a matchmaker service for matching mobile devices for online applications.

As illustrated in FIG. 15, one embodiment of a matchmaker service 111 can include a matchmaker dispatcher 1501 for receiving match requests and pushing match responses to mobile devices 120-122; a database 1512 for storing match requests in a request table 1502 and for storing matchable set data in a matchable set identifier ("MSI") table 1503; and one or more matchmakers 1510 for fetching match requests from the database 1512, performing matching operations, and storing the match results back in the database 1512. It should be noted, however, that the underlying principles of the invention are not limited to the specific architecture shown in FIG. 15.

In one embodiment, the matchmaker dispatcher 1501 acts as an interface to the matchmaker service 111, receiving requests from mobile devices 120-122, translating those requests into commands to store the requests in the database 1512, reading match results from the database 1512, and translating and communicating those results to the mobile devices 120-122.

In operation, when a new match request arrives, the matchmaker dispatcher 1501 can store the request within a row of the request table 1502. In one embodiment, the dispatcher 1501 assigns each match request a request ID ("RID") code, illustrated simply as "A," "B" and "C" in FIG. 15 (corresponding to mobile devices A, B and C, respectively). While shown using a letter designation in FIG. 15 for simplicity, the RID code may be a string, integer, or any other variable type suitable for tracking match requests within the database.

Each match request may be assigned a matchable set identifier ("MSI") value which is stored in the request table 1502. In one embodiment, the MSI can identify the specific application for which a match is being requested and/or the configuration parameters to be used for that application. For example, an MSI value of 12:4 may identify a particular multi-player game with the identifier "12" and may identify a particular configuration for the game with the identifier "4." More specifically, the ID code of 12 may identify a particular multi-player racing game and the ID code of 4 may specify a particular racing track, speed, or player experience level for the racing game. In one embodiment, application developers are provided the option to specify any application configuration parameters using MSI values in this manner. In one embodiment, rather than specifying an MSI directly, application developers specify a game ID (to identify a particular game) and a bucket ID (to identify a particular game configuration) and these values are mapped to an MSI value by the matchmaker dispatcher 1501.

Additionally, several different MSI values may be used within a single MSI to specify multiple different configuration parameters (e.g., 12:4:1 might represent: 12=racing game; 4=track; and 1=experience level). As described in detail below, in one embodiment, each MSI is used by a matchmaker 1510 to identify a set of match requests in which matchmaking operations can be performed (e.g., requests are grouped based on MSI and matches are performed within each MSI group). In one embodiment, each MSI may be dynamically modified/selected by the dispatcher to include a partition ID identifying different machine partitions. For example, if a particular MSI becomes overloaded, the dispatcher may split the MSI between two or more different servers and/or storage partitions (e.g., using designations such as 4:3:1 and 4:3:2 where the last digits identify partitions 1 and 2, respectively). A different matchmaker may then independently retrieve and process requests from each of the different MSIs from each of the different servers.

As illustrated in FIG. 15, match request data may also be stored within the request table 1502 for each request. The request data may include any data usable for rendering a matchmaking decision and/or any data needed to access the mobile device initiating the request over the network. For example, in one embodiment the match request data for each request includes the NAT type data and/or NAT traversal/connection data for the mobile device initiating the request. Other types of request data may also be stored within the request table 1502 such as device connection speed (100 kbps, 1 Mbps, etc), connection type (e.g., 3G, EDGE, WiFi, etc), device location (e.g., determined by geo-location techniques), language (English, Spanish, etc), and/or user preferences. The request data may be determined by each mobile device 120-122 and transmitted to the matchmaking dispatcher 1501 with each match request. For example, each mobile device may determine its connection data, connection type, device location, etc, using various techniques, some of which are described herein (e.g., communicating with a NAT traversal server to determine NAT traversal/connection data, using GPS to determine device location, reading HTTP information to determine language, etc).

As illustrated in FIG. 15, in one embodiment, each active MSI can be assigned a row in the MSI table 1503. In one embodiment, when a new request arrives, in addition to adding the request to the request table 1502, the dispatcher 1501 also checks the MSI table 1503 to determine whether an MSI already exists for that request (i.e., whether other requests having the same MSI have already been received). If no matching MSI is found, then the dispatcher 1501 may create a new entry in the MSI table 1503 for the new request. If a matching MSI is found, then the dispatcher can simply add the new request to the request table 1502 as described above.

Once the request table 1502 and MSI table 1503 are updated by the matchmaker dispatcher 1501, an instance of a matchmaker module 1510 (hereinafter simply referred to as "matchmaker 1510") fetches the data to perform matchmaking operations. Multiple matchmaker instances may be concurrently executed to perform matchmaking requests and a single matchmaker 1510 may concurrently process multiple matchmaking operations on multiple different MSI groups.

In one embodiment, when a matchmaker 1510 becomes available (e.g., after completing matching operations for an MSI group or after being initialized), it queries the MSI table 1503 to identify a new MSI to process. In FIG. 15, the "N/A" value in the matchmaker ID fields for MSI 3:1 indicate that the responsibility for processing this MSI has not yet been assigned to a matchmaker. In one embodiment, each MSI entry is time-stamped and the matchmaker 1510 selects an MSI having the oldest time-stamp.

In one embodiment, when a matchmaker 1510 assumes responsibility for a particular MSI, it updates its matchmaker ID code in the MSI table 1503 and specifies a lease duration for that MSI (e.g., 5 seconds). In one embodiment, the matchmaker 1510 continually updates the lease value as it processes matches for that MSI. The lease values may be used to identify MSIs which were assigned to failed matchmakers 1510. For example, if the lease value has expired, that MSI may be claimed by a new matchmaker notwithstanding the fact that the MSI table 1503 indicates that the MSI is already assigned to a matchmaker.

Once the matchmaker 1510 has assumed responsibility for an MSI, it can query the request table 1502 to read requests associated with that MSI into memory. The matchmaker 1510 can then perform matching operations to match users and mobile devices according to a set of matching criteria (e.g., as described below). The matchmaker 1510 can update the request table 1512 to indicate when matches of mobile device have been made. For example, the matchmaker can remove the MSI values from the MSI column in the request table 1512 and enter a predefined value to indicate that the match has been completed. In addition, the matchmaker 1510 may update the "request data" field for each participant to identify the other participants with which that participant was matched (e.g., by writing the NAT traversal/connection data needed to communicate with the other participants).

The dispatcher 1501 can periodically query the request table 1502 to identify completed matches. In response to detecting a completed match, the dispatcher 1501 may transmit a push notification to the mobile devices involved in the match (e.g., using the push notification techniques described herein and in the co-pending applications). In one embodiment, the push notification includes the "ticket" data structure described above. The mobile devices may then use each of their tickets to exchange connection data via the CDX service 110 as described above.

In addition to using push notifications, in one embodiment, the mobile devices 120-122 may periodically query the dispatcher 1501 to determine if a match has been made. Periodic queries are useful in case the push notification has not made it to the mobile device. However, because a push architecture is used, the periodic queries may be set to a relatively low rate, thereby reducing the load on the matchmaker service 111.

Figure 16:
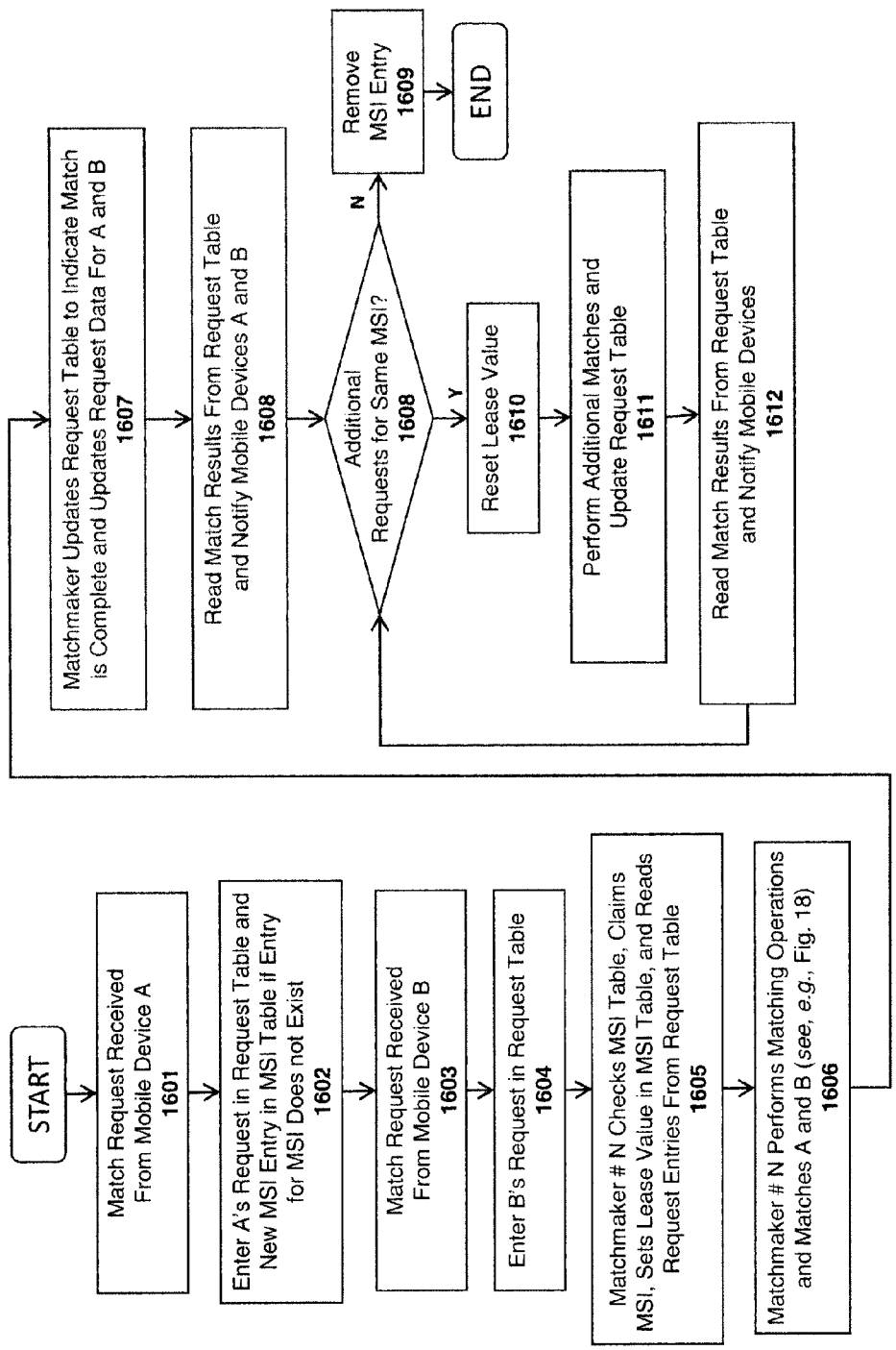
FIG. 16 illustrates one embodiment of a method for matching users/devices.

FIG. 16 illustrates an exemplary embodiment of a method in which two mobile devices, A and B, are matched by the matchmaker service 111. FIGS. 17*a-d* illustrate exemplary updates to the request table 1502 and the MSI table 1503 which may occur as the method progresses.

At 1601, a match request is received from mobile device A. At 1602, mobile device A's request is entered in the request table and a new MSI entry (MSI 1:1) is entered in the MSI table (if one does not already exist), as illustrated in FIG. 17*a*. At 1603, a match request is received from mobile device B and, at 1604, mobile device B's match request is also entered in the request table as illustrated in FIG. 17*b*.

At 1605, a particular matchmaker instance (matchmaker #N) checks the MSI table and detects that MSI 1:1 has not been claimed by another matchmaker instance. Alternatively, the matchmaker may detect an MSI table entry with an expired lease, indicating that the matchmaker previously working on the MSI has failed. In one embodiment, MSI entries with expired leases are given higher priority than new MSI entries (which have not yet been assigned a matchmaker). In addition, in one embodiment, relatively older MSI entries may be given higher priority than relatively newer MSI entries. Regardless of how the matchmaker selects the MSI, when it does, it adds its identifier and sets a new lease value for the MSI entry, as illustrated in FIG. 17c (e.g., using a lease value of 5 seconds in the illustrated example). The matchmaker may then query the request table and read the request table entries with that MSI into memory so that they can be processed.

At 1606, the matchmaker performs a series of matching operations to select an appropriate match for each of the requests. Certain embodiments of the matching operations are described below with respect to FIG. 18. Briefly, in one embodiment, the variables which are evaluated to determine "appropriate" matches include the NAT type (e.g., full cone, port restricted, symmetric, etc), the connection type (e.g., WiFi, 3G, Edge, etc), the language associated with the user (derived from the HTTP request accept-language header), and the age of each of the match requests. In general, the matchmaker 1510 may attempt to match mobile devices having compatible NAT types (although the relay service may sometimes be used as described below), the same connection types, and the same language. In one embodiment, the matchmaker 1510 may be more liberal with the matching requirements based on the age of the matching requests (i.e., the older the request, the more liberally the matching constraints will be applied).

Returning to FIG. 16, at 1607, following the matching decision, the matchmaker 1510 may update the request table to indicate that the matching is complete, as indicated in FIG. 17d. As part of the update, the matchmaker may also update the request data for mobile devices A and B. For example, in one embodiment, the matchmaker 1510 writes mobile device B's NAT traversal/connection data in the request data column for mobile device A and writes mobile device A's NAT traversal/connection data in the request column for mobile device B.

At 1608, the dispatcher 1501 can read through the request table to identify request entries which have been matched. In one embodiment, when it detects that mobile devices A and B have been matched, it reads the request data (updated by the matchmaker as described above), and generates a notification for mobile devices A and B. In one embodiment, the notification is the "ticket" data structure described above which is encrypted and includes the NAT traversal/connection data for each mobile device. As previously described, in one embodiment, the push notification service 1050 is used to push the notifications to mobile devices A and B. In addition, mobile devices A and B may periodically poll the dispatcher 1501 to determine whether a match has been made. In this embodiment, the polling technique may be done at a relatively slow rate to identify matches which, for some reason, were not successfully pushed to one of the mobile devices. Using push notifications to manage polling request load significantly reduces the load on the matchmaker service 111, which would otherwise be loaded with polling requests from mobile devices.

If additional match requests are pending for the same MSI, determined at 1608, the matchmaker may continue to match mobile devices/users within the MSI. At 1610, the matchmaker may reset the lease value within the MSI table 1503. At 1611, additional matches are performed and the request table is updated (as described above). At 1612, the additional matches are read from the request table and the additional mobile devices are updated (as described above). If no additional match requests are pending for the MSI then, at 1609, the MSI entry is removed from the MSI table (e.g., via a delete command from either the dispatcher and/or the matchmaker).

Figure 18:
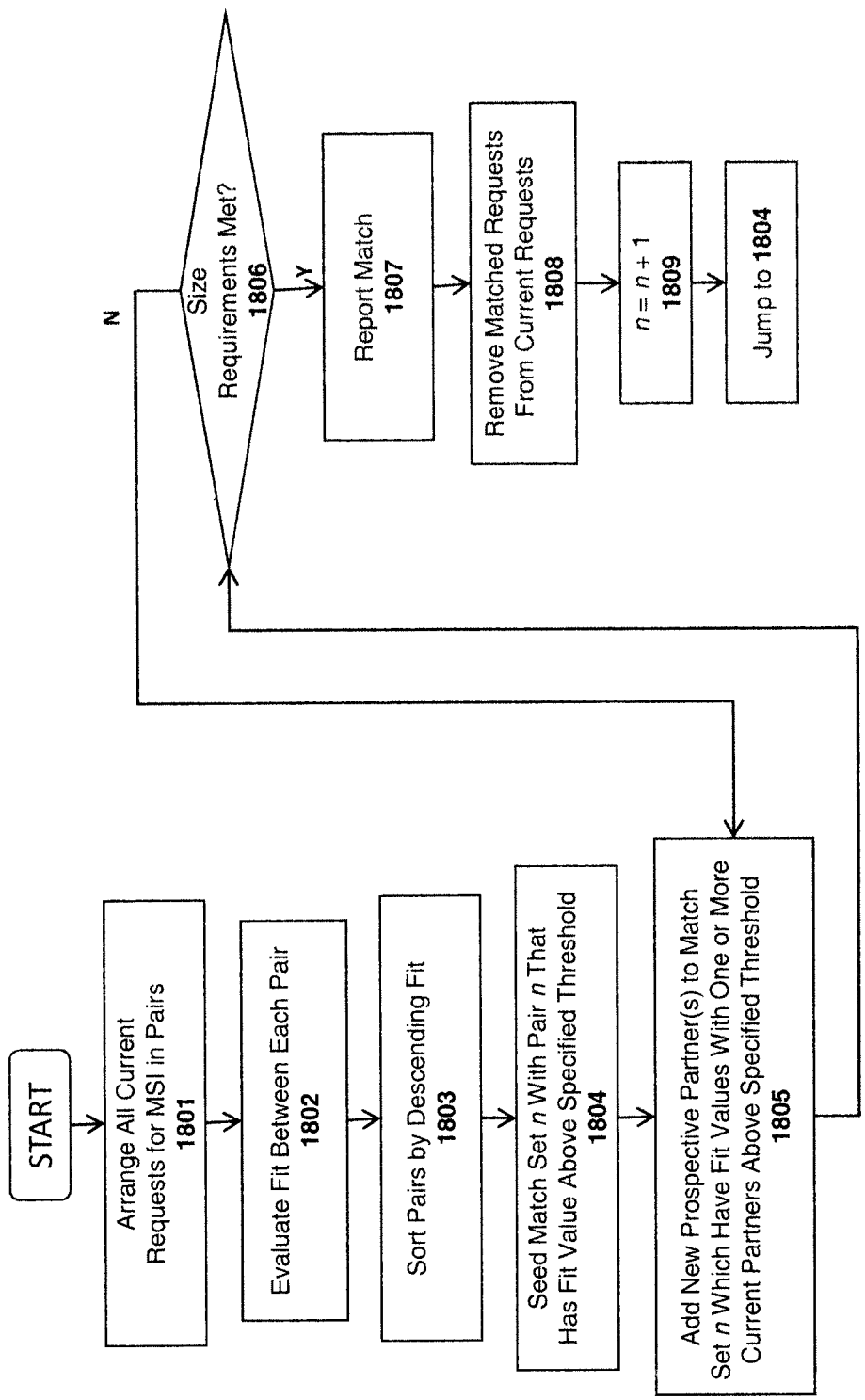
FIG. 18 illustrates a method for matching users/devices using different match fit variables.

FIG. 18 illustrates one embodiment of a method for performing matches between mobile devices/users (operation 1606 in FIG. 16). At 1801, all current MSI requests (e.g., for a particular application/bucket combination) are arranged in pairs. At 1802, the match "fit" between each pair is evaluated and, at 1803, the pairs are sorted by descending fit. The "fit" is evaluated based on a plurality of different variables including, but not limited to, the NAT type (e.g., full cone, port restricted, symmetric, etc), the connection type (e.g., WiFi, 3G, Edge, etc), the language associated with the user (derived from the HTTP request accept-language header), and the age of each of the match requests. Other variables which may be factored in to the matchmaking decision include the location of each of the mobile devices (e.g., with an attempt to match users in a particular location); minimum and/or maximum player requirements (e.g., specified by the user and/or the application); whether the one or more of the users included in the MSI are "friends" or have entered into a P2P connection previously (e.g., with a preference to matching "friends" or prior acquaintances); and user experience with the application (e.g., for a multi-player game, the leaderboard ranks of each of the users may be factored in, with a preference to matching similarly-experienced users).

As indicated in Table A below, in one embodiment, the evaluation of "fitness" is a numeric value between 0.0 and 1.0. Using a floating point value allows for normalization of the fitness for each criteria. To avoid floating point arithmetic, non-normalized integer values can be used with suitable evaluation so fitness values can be compared.

In one embodiment, all criteria have a binary fit where they are either compatible (having a normalized value of 1.0) or not compatible (having a normalized value of less than 1.0). These can be thought of as required criteria where the fit may change with age (as described below). If location is added as a variable, then the best fit may be one with the closest player that matches the required criteria.

TABLE A

Match Fitness

| Factor | Weight | Normalized |
|---|---|---|
| NAT Compatibility | 2.0 | 0.4 |
| Connection Type | 2.0 | 0.4 |
| Language | 1.0 | 0.2 |
| TOTAL | 5.0 | 1.0 |

In one embodiment, the Fit is equal to the Sum Of (Normalized Weight*Aged Factor Value) for each of the above criteria. The Aged Factor Value may start with a value of 1 and increase after a predetermined period of time has passed. It may then continue to increase as more time passes (e.g., periodically increasing by a specified amount). In one embodiment, instead of using the Aged Factor Value described above, age thresholds may be established as described below. The normalized/weighted values of certain variables such as Connection Type and Language may be applied above certain age thresholds (even if they do not match).

In one embodiment, the "fit" between a pair of requests, A and B, is the average of the fit of A with B and B with A. Moreover, the fit of A with B for each factor may be adjusted based on A's age (and vice versa). In one embodiment, a fit of 1.0 may be required for a compatible match. This means A and B will only match if the NAT compatibility, Connection Type and Language match (resulting in a normalized value of 1.0) or if A and/or B have aged so that some of the above variables (e.g., the Connection Type and Language) are effectively ignored (either using the aged factor value above or the thresholds below).

TABLE B

| Ages | | | | | |
|---|---|---|---|---|---|
| Age | Thresh. 1 | Thresh. 2 | Thresh. 3 | Thresh. 4 | Thresh. 5 |
| Older Than | 0 sec | 1 sec | 5 sec | 10 sec | 30 sec |

Age thresholds may be established as set forth in Table B above. As each age threshold is passed (i.e., as the request becomes older than the specified threshold), the aged factor value may be increased to successively larger values (e.g., 1.5, 2.0, etc). Alternatively, or in addition, as different age thresholds are passed, weighted values for certain variables may be added to the matching decision (e.g., such as connection type and language as described below).

In one embodiment, the request age limits specified in Table B are adjusted according to the match flow rate for a given MSI. In one embodiment, the flow rate is specified as a number of matches being performed per a specified unit of time (e.g., every 10 seconds, every minute, etc). Thus, the flow rate provides an indication as to how busy a particular MSI set is. In one embodiment, the busier the set, the lower each of the above thresholds may be set in Table B above to increase the probability of an early successful match and reduce the load on the matchmaker. Moreover, the load for a given MSI set may be provided to the end user (e.g., in the form of an estimated time to match value), so that the end user can choose whether to attempt to enter a multi-player game which is particularly busy. The load value may be provided to the user in the form of a push notification.

Turning now to each of the variables from Table A, in one embodiment, NAT compatibility is determined from the NAT compatibility chart 1400 shown in FIG. 14. If two NATs are determined to be compatible based on this chart, then the NAT compatibility weight may be applied.

TABLE C

| Connection Type | | | |
|---|---|---|---|
| A/B | WiFi | Edge | 3G |
| WiFi | 1.0 | 0.0 | 0.0 |
| Edge | 0.0 | 1.0 | 0.0 |
| 3G | 0.0 | 0.0 | 1.0 |

The connection type may be evaluated using a chart such as that shown above as Table C. In this example, if the connection type of devices A and B is the same (as indicated by a 1.0 in the cells where the same connection types meet), then the weighted connection type value from Table A may be included in the fitness determination. As mentioned above, the age of each of the requests may be used to affect the connection type determination. For example, in one embodiment, the fit value for connection type is selected using the matrix in Table C for ages at threshold 1, 2, and 3. For ages at threshold 4 or above, the connection type may be set to 1.0 (even for non-matching connection types) and the corresponding weighted connection type value may be applied. While connection "type" is used in some embodiments, connection speed may be determined and used with, or instead of, connection type. For example, connection speeds within certain specified ranges may be considered "compatible" (e.g., 0-100 kbps; 100-500 kbps; 500-1000 kbps, 1000-1500 kbps, etc). Any of the matching variables discussed herein may also be applied as weights to the match fit calculation and aged as described above.

In one embodiment, the player language can be derived from the HTTP request accept-language header which may contain one or more languages with a preference qfactor. The dispatcher can extract the most preferred language and pass this information to the matchmaker. In one embodiment, the weighted language value from Table A is set to 1.0 if the languages are the same or 0.0 if they are not. However, in one embodiment, the weighted language value may be applied even if the languages are different if the age is above a specified threshold (e.g., if the age is at threshold 2 or above in Table B).

In one embodiment, a match may be made between two users with incompatible NAT types. For example, if the matchmaker is having difficulty matching users for a particular MSI, after a specified period of time it may route connections through the relay service 1051 using the techniques described above. In this way, the relay service 1051 acts as a pressure valve, allowing aging matches to occur notwithstanding incompatible NAT types. The relay service 1051 may also be used in response to detecting one or more failed match attempts. In this embodiment, each match request submitted by a mobile device may include an indication as to whether one or more unsuccessful matches was previously attempted.

Various additional match criteria may be evaluated and provided a weight value as part of the match fit determination including, by way of example and not limitation, an indication as to whether any of the users requesting matches are friends. For example, the matchmaker 1510 may attempt to match any requests for users who are "friends" by applying a "friends" weight to the match fit calculation. Similarly, friends of friends may also be weighted (e.g., with 2 or more degrees of separation). Additionally, a player may rate other players for a particular game and the matchmaker may evaluate those ratings when performing a match (with a tendency to match a user with those players who have relatively higher ratings and not to match a user with players who have low ratings). Moreover, the latency of a user's connection may be evaluated (e.g., using a simple ping operation) and used as part of the matchmaking decision.

Yet another variable used to match players may be device type. For example, the matchmaker 1510 may attempt to match players with similar device types (e.g., iPads, iPods, iTouches, iPhones, RIM Blackberries, etc). Additional variables may include a user's leaderboard ranking, current location, current residence, age, gender, and similar game collections may similarly be evaluated for the match determination (i.e., in many cases tending to favor matches between those users with similar criteria). Finally, parental controls may be evaluated by the matchmaker 1510 to ensure that users are only matched with appropriate MSIs and with other users of the same age.

The matchmaker service 111 may retrieve any of the above variables from one or more databases managed within the data service 100 (see, e.g., database 1920 described below with respect to FIG. 19). For example, a user's friend data may be accessed from a friends service database and other information such as each user's age, gender, game collection, etc, may be accessed from one or more other databases (e.g., a user profile, a games database, a leaderboard database, etc). In one embodiment, all of the services described herein are provided with access to the same central database (or group of databases) for storing all of the various different types of user/device data used for making matchmaking decisions.

While several specific examples are provided above, it will be appreciated that the underlying principles of the invention are not limited to any particular set of variables for determining a fitness level for a match. In one embodiment, application programmers designing applications to be run on the system and method described herein may specify their own set of criteria for matching and/or for grouping requests using different MSI criteria.

Turning back to the method of FIG. 18, once the match "fit" between each pair has been determined, at 1803, the pairs are sorted by descending fit (e.g., with the pairs having the highest fit at the top of the list). At 1804 "match sets" are seeded with those pairs which have the highest fit values above the specified threshold. As described above, the "threshold" value may be set to the normalized value of 1.0 shown above in Table A. At 1805, new prospective partners are added to the match set which have fit values with one or all of the current members in the match set above a specified threshold. For example, if a match set has initially been seeded with A and B, then C may be added to the match set if the fit value of A-C and/or B-C are above the specified threshold. In one embodiment, if only a single match fit is above a threshold for a prospective party, then that party may be added to the match set (i.e., because, if necessary, that party will be able to communicate to all of the parties through the one party with which it has a suitable match fit). Once one or more new parties have been added to the match set, if the size requirements for the match have been met, determined at 1806, then the match results are stored and reported at 1807 (e.g., by updating the request table 1502 and transmitting notifications as described above). In one embodiment, a single match request may represent multiple users (e.g., when a match request follows an invitation sequence as described below). In this case, the size requirements are evaluated based on the number of users represented by each match request. If the size requirements have not been met, then the process returns to 1805 and a new party is added to the match set (i.e., a party having a match fit with one or more of the current members of the set above a specified threshold).

At 1808, the matched requests are removed from the current set of requests being processed by the matchmaker 1510. At 1809 the next seeded match set is selected and the process returns to 1804 for additional matching. Although illustrated in FIG. 18 as a sequential process, it should be noted that multiple seeded match sets may be processed concurrently while still complying with the underlying principles of the invention.

Although described above as separate services, the matchmaker service 111 and the invitation service 112 may operate together to connect P2P users. For example, in one embodiment, a first user may invite one or more friends to an online session and request a match with one or more additional users (e.g., INVITE friend "Bob" and match 3 additional players for a multilayer video game). In such a case, the invitation service 112 may initially process the first user's invitation request to connect the first user and the first user's friend(s). The results of the invitation request (e.g., a successful P2P connection) may then be reported back to the user's mobile device. The matchmaking service 111 may then receive a match request from the first user's mobile device (or, in one embodiment, directly from the invitation service or from the first user's friends) requesting additional players. In response, the matchmaker service 111 may match the first user with one or more other match requests having the same MSI as the first user's request (as described above). The match request may include only the first user's matching criteria or may include the first user's and the first user's friend's matching criteria (e.g., NAT type, connection type, language, location, etc). In one embodiment, if one or more of the first user's friends cannot establish a direct P2P connection with another matched user, the matched user's connection with the first user's friends may by established through the first user's data processing device (e.g., using the first user's mobile device as a proxy for the connection) and/or the relay service may be used to connect the users (as described above).

In one embodiment, the first user may initially be matched with one or more users by the matchmaking service (as described above) and then the first user may invite one or more friends to join the online session with the first user and the matched users. In this embodiment, both the user's information and the matched users' information (e.g., NAT/connection data, user IDs, push tokens, etc) may be exchanged with the invited users through the invitation service (as described above). The underlying principles of the invention remain the same regardless of whether matching occurs first, followed by invitation or whether invitation occurs first, followed by matching.

Figure 19:
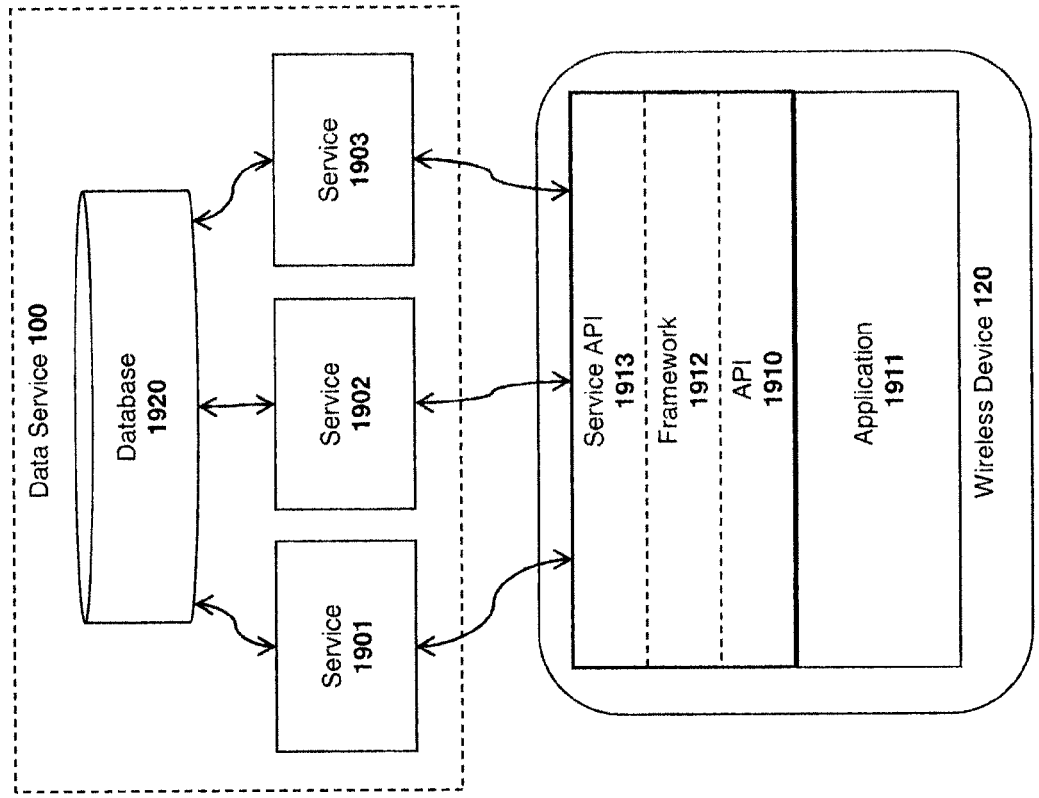
FIG. 19 illustrates a framework exposing an application programming interface (API) for applications and a service API for communicating with a set of services.

Application Framework with an Application Programming Interface for Collaborative Online Applications As illustrated in FIG. 19, one embodiment of the invention is implemented within the context of a mobile device 120 having a predefined software framework 1912 with an application programming interface ("API") 1910 for interfacing with one or more applications 1911 and a service-side API 1910 for communicating with a plurality of network services 1901-1903. As shown in FIG. 19, the network services 1901-1903 may be designed and/or managed by the same online data service 100 (although such a configuration is not required). Applications 1911 such as P2P gaming applications and other types of collaborative online applications may be designed to access the network services 1901-1903 through the API 1910 by making calls to the API 1910. The design of applications 1911 may be facilitated using a software development kid ("SDK") provided by the developer of the framework 1912 and the network services 1901-1903. A more specific implementation of the framework 1912 and APIs 1910, 1913 is described below with respect to FIG. 20.

As illustrated, each of the services may be provided with access to a database 1920 for storing data used by the services. One particular example is the database 1512 used by the matchmaker service 111 (described above). Other examples may include a leaderboard database for storing leaderboard data, a friend service database for storing friend state records, a profile database for storing user profile data and a games database for storing data related to online games. Any type of database may be used (e.g., MySQL, Microsoft SQL, etc) but in one particular embodiment, a key/value database such as Berkley DB and/or MZBasic DB can be used. The databases may be spread across a large number mass storage devices (e.g., hard drives) in a Storage Area Network (SAN) or other storage configuration.

Consequently, when a particular service processes and/or stores data as described above, the data may be stored within the database 1920. Some services, however, may not utilize a database. For example, as described above, the invitation service 112 may be implemented as a stateless service and, therefore, may not be required to store data within a database 1920 (although such an implementation is still possible in accordance with the underlying principles of the invention).

The API 1913 may be designed to communicate and exchange information with the network services 1901-1903 using any suitable network protocol stack including, for example, TCP/IP or UDP/IP at the network layer and HTTPS at the application layer. An remote procedure call (RPC)-based protocol over HTTP or HTTPS such as SOAP may be used and/or a Representational State Transfer (REST) protocol may be used. Moreover, the services may be implemented on any computing platform including, by way of example, Xserve or similar servers running Unix, Linux or an Apache software platform. In one particular embodiment, the platform includes Web objects implemented on Linux. The foregoing examples are provided merely for the purpose of illustration. The underlying principles of the invention are not limited to any particular mechanism for linking applications to services or any particular set of network protocols.

Figure 20:
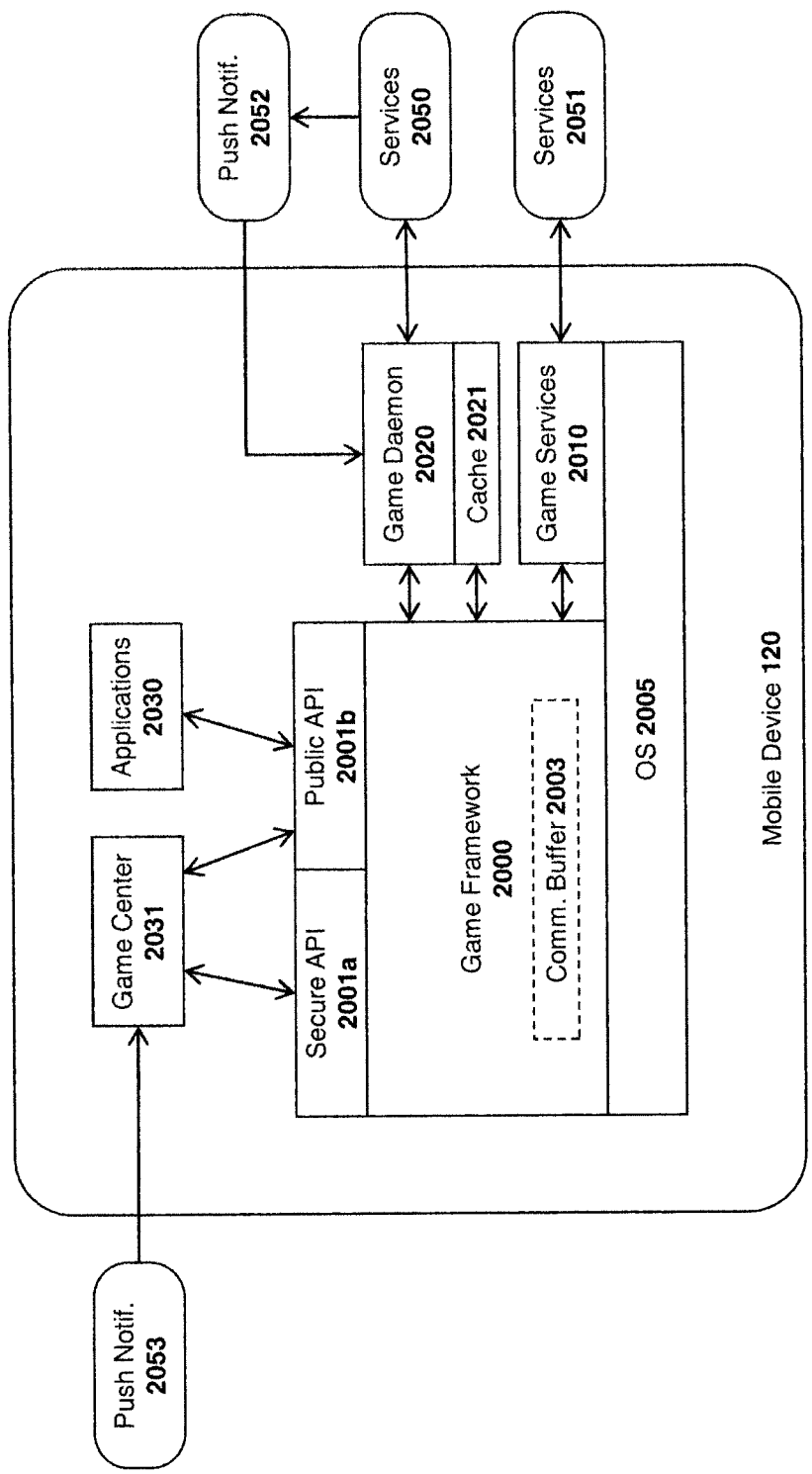
FIG. 20 illustrates one embodiment of a game framework with an API for applications, a game daemon and a game services module for communicating with services.

FIG. 20 illustrates a more detailed software architecture including application programming interfaces (APIs) 2001a-b which can be implemented on the wireless device 120 in one embodiment of the invention. Although this embodiment is described within the context of a multi-player game framework 2000, the underlying principles of the invention are not limited to a gaming implementation. For example, the software architecture shown in FIG. 20 may be used to support various collaborative applications which are not games (e.g., collaborative chat, multi-party collaborative audio/video, etc).

In the architecture shown in FIG. 20, a game framework 2000 is provided to support the various multi-party features and P2P features described herein. In one embodiment, the game framework 2000 is designed to run on the mobile device's operating system 2005. For example, if the mobile device 120 is an iPhone, iPad, or iPod Touch, the operating system 2005 can be the iPhone OS, a mobile operating system designed by the assignee of the present application.

The game framework 2000 can include a public application programming interface (API) 2001b and a private or "secure" API 2001a. In one embodiment, a game center application 2031 designed to provide various game-related features described herein can make calls to both the public API 2001b and the private API 2001a, whereas other applications 2030 (e.g., applications designed by third parties) are provided with access to only the public API 2001b. For example, the designer of the mobile device 120 may wish to keep certain API functions which involve potentially sensitive information out of the public API 2001b to avoid abuse by third party developers (e.g., friend requests, friends lists, etc). However, both the secure API 2001a and the public API 2001b may be merged into a single API accessible by all applications on the mobile device (i.e., the separation of the API into separate public and private components is not required for complying with the underlying principles of the invention). The designation "API 2001" is sometimes used below to refer to operations which may be found in either the public API 2001b and/or the private API 2001a.

One embodiment of the game center application 2031 is described in the co-pending application entitled Systems and Methods for Providing a Game Center, Ser. No. 61/321,861, Filed Apr. 7, 2010, having inventors Marcel Van Os and Mike Lampell (hereinafter "Game Center Patent Application"), which is assigned to the assignee of the present application and which are incorporated herein by reference. Briefly, the game center application 2031 includes a game-centric graphical user interface (GUI) for navigating through multi-player games; purchasing new games; retrieving information related to games (e.g., leaderboard information, achievements, friend information, etc); contacting friends to play games; requesting game matches with other users; and inviting specific users. Various other functions performed by the game center application 2031 are described in the Game Center Patent Application referenced above. Some of the game center functions may be provided by the game framework 2000 and made accessible to other applications 2030 through the public API 2001b.

In one embodiment, the API 2001 exposed by the game framework 2000 simplifies the process of designing multi-player, collaborative games for the mobile device 120. In particular, in one embodiment, the API 2001 allows developers to make a simple API call to invoke the relatively complex process of connecting users for a multi-player, P2P game session. For example, a simple API call such as INVITE (Player B ID, Bucket ID), may be invoked from the API 2001 to initiate the detailed invitation sequence described above. Similarly, an API call such as MATCH (Player A ID, Bucket ID) may be invoked from the API 2001 to initiate the detailed matchmaking sequence described above. The INVITE and MATCH functions are sometimes generally referred to herein as "P2P Connection Functions." In one embodiment, the game framework 2000 includes the program code required to manage the invitation and matchmaking operations in response to these API calls (as described in greater detail below). It should be noted that the actual API functions may have somewhat different data formats than those set forth above, (although they may result in the similar operations performed by the game framework 2000). The underlying principles of the invention are not limited to any particular format for specifying API functions.

Various other types of game-related transactions and information may also be managed by the game framework 2000 on behalf of the game center 2031 and other applications 2030. Some of this information is described in the Game Center Patent Application. By way of example and not limitation, this information may include "leaderboard" information related to those users who have achieved top scores for each game and "achievements" information identifying users who have completed certain game-specific achievements. Each application developer may specify their own set of "achievements" for each game application 2030 (e.g., completed levels 1-3; completed level 1 in under 5 minutes; over 50 kills per level; knocked down 20 flags; etc).

The game framework 2000 may also include program code for managing a user's friends data and for integrating the friends data within the context of the game center 2031 and other gaming applications 2030. For example, when the user selects a link to a particular game within the game center 2031, information related to each of the user's friends may be displayed for that game (e.g., the friends' ranking on the leaderboard, the friends' achievements, the results when the user played the game with each of his/her friends, etc). In one embodiment, the API 2001 of the game framework 2000 includes functions for accessing friends data managed by a friend service such as that described in the co-pending application entitled Apparatus and Method for Efficiently Managing Data in a Social Networking Service, Ser. No. 61/321,848, Filed Apr. 7, 2010, having inventors Amol Pattekar, Jeremy Werner, Patrick Gates, and Andrew H. Vyrros (hereinafter "Friend Service Application"), which is assigned to the assignee of the present application and which is incorporated herein by reference.

As illustrated in FIG. 20, in one embodiment, a game daemon 2020 may interface the game framework 2000 to a first set of services 2050 and a game services component 2010 may interface the game framework 2000 to a second set of services 2051. By way of example, the first set of services 2050 may include the invitation service 112, matchmaker service 111, and relay service 1051 described above and the friend service described in the Friend Service Application referenced above. Other services which may be accessed via the game daemon 2020 include a leaderboard service (providing leaderboard data); a game service (providing statistics and other data related to each of the games and the ability to purchase game); a user authentication service (for authenticating the user of the mobile device); and/or a user profile service (for storing user profile data such as user preferences). The second set of services 2051 accessed via the game services component 2010 may include the connection data exchange (CDX) service 110 and the NAT traversal services 290-291 described above. Although illustrated as separate components in FIG. 20 for the purpose of illustration, the game daemon 2020 and the game services module 2010 may actually be components of the game framework 2000. In one embodiment, the game daemon 2020 and 2010 communicate with each of the network services 2050-2051 through a predefined API which, in one embodiment, is a private API (i.e., not published to third party developers).

In one embodiment, the game daemon 2020 can communicate with the matchmaker service 111, invitation service 112, and other services 2050 using the HTTPS protocol while the game services module 2010 can communicate with the CDX service 110 and the NAT traversal services 290-291 using a relatively lightweight protocol such as UDP sockets. However, as previously mentioned, various other network protocols may be employed while still complying with the underlying principles of the invention.

In addition, as illustrated in FIG. 20, the game daemon 2020 may receive push notifications 2052 generated by certain services 2052 (e.g., the invitation service and matchmaker service) while other types of push notifications 2053 may be received directly by the game center (e.g., friend service notifications such as new friend requests). In one embodiment, these push notifications 2053 are provided directly to the game center 2031 to ensure that a user's sensitive data is not made accessible to applications 2030 designed by third party application developers.

Returning to the game invitation examples set forth above in FIG. 11, when an application 2030 on mobile device A makes an invitation call to the API 2001b of the game framework 2000 to invite a user of mobile device B (e.g., INVITE (Player B ID, Game/Bucket ID)), the game framework 2000 may pass the invitation request to the game daemon 2020 of mobile device A. The game daemon 2020 may then communicate with the invitation service 112 to submit the invitation request. The invitation service 112 can then use the push notification service 1050 (as described above) to push the invitation to the game daemon 2020 of mobile device B. The game daemon 2020 of mobile device B may then communicate with the game framework 2000 of mobile device B to determine whether the game for which the invitation was sent is installed on mobile device B. If so, then the game framework 2000 may trigger the application 2030 and/or generate a visual notification of the invitation. If the application is not installed, then the game framework 2000 may trigger a visual notification of the invitation to the user of mobile device B with an offer to purchase the game (e.g., via the game center 2031 GUI). Alternatively, the visual notification may be generated by a push notification daemon running on the mobile device 120 (not shown). If the user of mobile device B purchases the game, the invitation sequence may continue following the purchase. If user of mobile device B accepts the invitation request, then the game framework 2000 of mobile device B may pass the invitation request to its game daemon 2020 which can then respond to the invitation service 112.

Recall that in FIG. 11, the compatibility check 1106 determines that the NAT types of mobile devices A and B are compatible. Thus, at 1108, mobile device A's game daemon 2020 may receive mobile device B's acceptance (e.g., via push notification in the example) and, in one embodiment, passes the acceptance to the game framework 2000. At this stage, the game framework 2000 of mobile device A may either notify the requesting application 2030 that mobile device B has accepted (via the API 2001) or may wait to notify the requesting application 2030 until the devices have been successfully connected. In either case, the game framework 2000 may pass a connection request to the game services module 2010 which, in one embodiment, may initiate a connection data exchange with mobile device B. In particular, the game services module may transmit mobile device A's connection data to mobile device B using the CDX service 110 (see, e.g., transactions 1111 and 1112 in FIG. 11). As described above, this communication may be implemented as a UDP connection using a secure "ticket" data structure.

Recall that in FIG. 12, if the compatibility check 1106 determines that the NAT types of mobile devices A and B are not compatible then the relay service 1051 may be used to provide a connection between the devices. Consequently, the game daemon 2020 of mobile device B may receive a relay response 1203 from the invitation service (shown in FIG. 12) and the game daemon 2020 of mobile device A may receive a relay response 1205 from the invitation service (via the push notification service 1050). The game daemons 2020 of mobile devices A and B may communicate with the relay service at 1206 and 1207 to retrieve configuration data. At 1210, the game daemon 2020 of mobile device B receives relay update data from mobile device A and, at 1213, the game daemon 2020 of mobile device A receives relay update data from mobile device B.

The end result of the processes shown in FIGS. 11 and 12 is that mobile devices A and B have established a connection with one another (either a direct, P2P connection or a relay connection). In one embodiment, upon detecting a successful connection, the game framework 2000 may notify the application 2030 which requested the connection using an API call (e.g., CONNECTED (Player A ID, Player B ID)). Mobile devices A and B may then play the specified game or other collaborative application 2030 using the established connection.

Thus, in response to a relatively simply call from the API 2001 (e.g., INVITE Player B ID, Game/Bucket ID), a complex series of transactions may be managed by the game framework 2000 to establish a P2P or a relay connection between mobile devices A and B. In one embodiment, the game framework 2000 performs the sequence of operations to connect mobile devices A and B, and then provides the results to the requesting application 2030, thereby leaving the details of the API call transparent to the application designer. As such, the application designer is not required to understand how to connect mobile devices A and B on the network, or to perform various other functions required for enabling communication between the devices, thereby simplifying the application design process.

In a similar manner, the game framework 2000 can establish a match between mobile device A and other participants using the matchmaker service 111 as described above with respect to FIG. 2a-b. In this example, the application 2030 may make a simple call to the API 2001 such as MATCH (Player A ID, Game/Bundle ID). In response, the game framework 2000 can manage the matching and connection data exchange operations. When the matching operations and/or P2P connections are complete, the game framework 2000 provides the results back to the application 2030.

For example, in FIG. 2b, the game framework 2000 may use the game services module 2010 to communicate with the connection data exchange (CDX) service 110 and NAT traversal services 290-291 and may use the game daemon to communicate with the matchmaker service 111. Once a match has been made, the game daemon 2020 of mobile device A receives Ticket A at 229 and the game framework 2000 uses this information to implement a connection data exchange through the game services module 2010. For example, at 232, it may request its own connection data through the NAT traversal service 290 and may then exchange its connection data at 233-234 through the CDX service 110. At 237 and 240, the game services module 2010 of mobile device A receives connection data for mobile devices B and C, respectively. Following these exchanges, the game services module 2010 establishes P2P connections at 241 and the game framework 2000 notifies the application 2030 that the connection process is complete using an API notification (e.g., MATCH COMPLETE (Player B ID, Player C ID)). The application may then execute using the established P2P connection.

In some embodiments, the user may be given the option to play a game with other friends who are currently registered as "online." In this case, the notification that certain friends are online may be provided via the push notifications 2052 or push notifications 2053 (received directly by the game center 2031). The game center 2031 and/or applications 2030 may then provide the notifications to the user and provide the user the option to play with one or more selected online friends. It should be noted, however, that the invitation sequence described herein will work regardless of whether online notifications are provided. In one embodiment, the user's online status may be monitored by a service accessible by the game daemon 2020 (e.g., by the friend service mentioned above or by a separate "presence" service).

One embodiment of the game framework 2000 provides for a combination invitation/matchmaking operation in which a user may invite one or more friends to play a game with a group of unknown matched participants. For example, if a game requires 4 players and a first user invites a second user to play the game, then the invitation service 112 may initially connect the first user and second user and the matchmaking service 111 may then match the first user and second user with two (or more) other players. In this embodiment, the game framework 2000 may initially perform the invitation sequences described above to connect the first user and the second user. In one embodiment, once the first user and second user have been successfully connected, the game framework 2000 may implement the matchmaking sequences to identify and connect with the other users. A mentioned above, in one embodiment, the matching criteria applied by the matchmaking service may include both the first and second user (e.g., NAT types, connection types, language, etc, of both the first and second user). Alternatively, the criteria of one of the two users may be evaluated to make the matching decision.

Once all of the users are connected, the game framework 2000 may provide the connection results to the application 2030 which requested the connection via the API 2001. Once again, in response to a relatively simple API call by an application 2030, the game framework 2000 enters into a set of complex transactions to connect each of the devices. Once the devices have been successfully connected, the game framework 2000 provides the results back to the requesting application 2030.

As illustrated in FIG. 20, the game framework 2000 may include a communication buffer 2003 to temporarily store communication between the user and other game participants. The communication may include, for example, text, audio and/or video communication. The game framework 2000 can establish the buffer 2003 based on the requirements of each application 2030. For example, a relatively larger buffer 2003 may be required for audio/video communication with a slow network connection. In one embodiment, each application 2030 may make an explicit request to establish a communication buffer of a certain size via the API 2001 (e.g., using a BUFFER (size) command). Alternatively, the game framework 2000 may automatically create a buffer based on the communication requirements of each application. For example, the game framework 2000 may select a particular buffer size based on whether text, audio, and/or video need to be supported.

In one embodiment, the communication buffer 2003 may temporarily store communication streams before all of the P2P connections have been established between users. For example, after the invitation service 112 or matchmaker service 111 has identified each of the users but before the CDX service 110 has completed the connection data exchange operations, each user may be notified of the other game participants in the process of being connected. At this stage the user of the mobile device 120 may transmit text, audio and/or video communication streams to the other participants. The game framework 2000 will store the communication streams within the communication buffer 2003 for those participants who are not yet connected. The game framework 2000 may then transmit the text, audio and/or video from the buffer 2003 as the connection for each device is completed.

In one embodiment, the game daemon 2020 includes a cache 2021 for caching data persisted on each of the services 2050 to reduce the network traffic. For example, the user's friends list, leaderboard data, achievements data, presence data, and profile data may be stored in the cache 2021 as specified by a cache management policy. In one embodiment, the cache management policy is driven by each individual service on which the data is stored. Consequently, for n different services, n different cache management policies may be applied to the cache 2021. In addition, because the cache management policy is driven by the services, it may be modified dynamically based on current network and/or server load conditions. For example, during periods of time when a service is heavily loaded (e.g., Christmas, the day of a new product release, etc.), the service may dynamically specify a cache management policy with relatively infrequent cache updates (e.g., updates every 12 hours). By contrast, during periods of time when a service is not heavily loaded, the service may specify a caching policy with more frequent cache updates (e.g., updates every ½ hour, hour, 2 hours, etc).

In one embodiment, the cache management policy is specified using a time-to-live (TTL) value for certain data records stored in the cache 2021. When a data record has been stored in the cache past its TTL value, then that data is considered "stale" and a local request for that data may be forwarded directly to the service associated with that data. In one embodiment, the request includes an ID code identifying a current version of the data. If the ID code matches the ID code on the service, then the data is still valid and does not need to be updated. A response may then be sent back from the service indicating that the data in the cache is current and the TTL value for the data record may be reset.

In addition to using a cache management policy as described above, in one embodiment, cache updates for certain types of data may be pushed to the mobile device using the push notification service 1050. For example, changes to a user's friends list or to the current online status of the user's friends may be dynamically pushed to the user's mobile device 120. The push notification may be received by the game daemon 2020 which may then update the cache 2021 to include the relevant portion of the data pushed by the service (i.e., an update all of the data in the cache associated with that service may not be required). By contrast, some push notifications may instruct the game daemon 2020 to overwrite the entire contents of cache (or at least the portion of the cache associated with the service performing the push).

Those services which utilize push to update the cache 2021 may choose relatively high TTL values (and/or may not set TTL values) because they have the ability to push notifications to update data stored in the cache 2021. In one embodiment, each service specifies a set of events which may trigger a push notification cache update. For example, cache update events may include a change to a friend's online status, a new friend request, an acceptance of a friend request, a de-friend operation, an indication that a friend is playing a particular game, a game achievement reached by a friend, an update to the top 10 of a particular leaderboard, or any other events deemed to be of sufficient importance to warrant a cache update. Using push notifications to update the cache 2021 in this manner may decrease network and service load because, with push updates, periodic polling between the mobile device and the service is not required.

One embodiment of the game framework 2000 uniquely formats data presented to the end user based on the country and/or geographical location of the user. For example, values such as current date, time and monetary values may be presented differently for users in different countries and locations. By way of example, in the United States the date format may be [month day, year] (e.g., Apr. 25, 2010) whereas in other countries, the date format may be [day month, year] (e.g., 25 Apr., 2010). Similarly, when representing time in the US and some other countries the AM/PM designation may be used and a colon may be used between hours and minutes (e.g., 3:00 PM). By contrast, many other countries do not use the AM/PM designation and/or use a comma between hours and minutes (e.g., 15,00). As another example, many parts of the world use the metric system while some parts of the world do not (e.g., the United States). It should be noted that these are simply illustrative examples which may be used by certain embodiments of the invention. The underlying principles of the invention are not limited to any particular set of data formats.

In one embodiment, these different data formats may be selected when displaying leaderboard data, achievements data, friends data, and/or any other data processed by the game framework 2000. The game framework 2000 may determine the country and/or geographical location of the user in various ways. For example, in one embodiment, this information is simply provided in the user's profile data and/or may be determined based on the user's cellular service provider. The user's location may also be determined using, for example, Global Positioning System (GPS) tracking.

Other types of data formatting which are unrelated to geographical location and/or country may also be managed by the game framework 2000. For example, when displaying leaderboard data, it is important to know whether the lowest score should place the user at the top or bottom of the leaderboard. For some games (e.g., golf, track, racing, skiing, etc), a lower number indicates a better performance whereas in other games (e.g., football, baseball, etc), a higher number indicates a better performance. Thus, in one embodiment, the application 2030 specifies the type of score which will be used via the API 2001 (e.g., "ascending" or "descending"). The game framework 2000 may then use the appropriate set of labels and formatting for displaying the score.

One embodiment of the game framework 2000 also filters user data based on the relationship between the user and the user's friends. For example, one embodiment of the invention allows for a "detailed" view, a "friends" view, and a "public" view. In one embodiment, the detailed view is available to the user who owns the data (i.e., the user's personal information); the friends view is available to the user's friends; and the public view is available to all other users.

By way of example, the public view may simply include an "alias" name associated with each user, the games played by the alias and associated scores, and the dates/times on which the games were played. This information may be used by the game framework 2000 to populate a public leaderboard which may then be displayed via the game center 2031.

The friends view may include all of the information from the general view as well as any additional information to be shared among the user's friends including, for example, the games owned by the user; the games played by the user; the user's achievements and scores; how many friends the user has; the identify of those friends; URL identifying the user's avatars, and/or the user's online status, to name a few. In one embodiment, the "friends" view provides a default set of information to be shared with friends but the end user may adjust this default configuration and specify with particularity the types of information to be shared by each individual friend or groups of friends (e.g., co-workers, family members, college/high school friends, etc).

The "detailed" view may include all of the information from the "public" and "friend" views as well as any other information managed by the various services 2050 on behalf of the end user. By way of example, this may include all of the user's profile data; the user's Universally Unique Identifier ("UUID") (sometimes referred to herein as the "Player ID"); player name; alias names; number of games and the identity of the games; the user's friends; all of the user's achievements, etc.

In some circumstances, an application 2030 may only require a small amount of information related to each user such as each user's Player ID. For example, in one embodiment, when a match is requested, the game framework 2000 may initially only require each player's ID. As matches are made by the matchmaker service (see above), the game framework 2000 may determine whether any of the matched users are friends (e.g., via communication with the friend service and/or by interrogating the user's local friend data). If so, then the game framework 2000 may retrieve additional user data and provide that data to any matched friends. In this way, the game framework 2000 filters information based on the identity of the users and the relationship between each of the users.

In one embodiment, the game framework 2000 initially provides a public view between a first user and a second user if the two users do not have a friend relationship. However, in one embodiment, the game framework 2000 allows the first user to send a friend request to the second user (e.g., using the second user's alias). If the friend request is accepted, then the game framework 2000 will provide additional information to each of the users (e.g., the default "friend" view).

Different API Embodiments

The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 21:
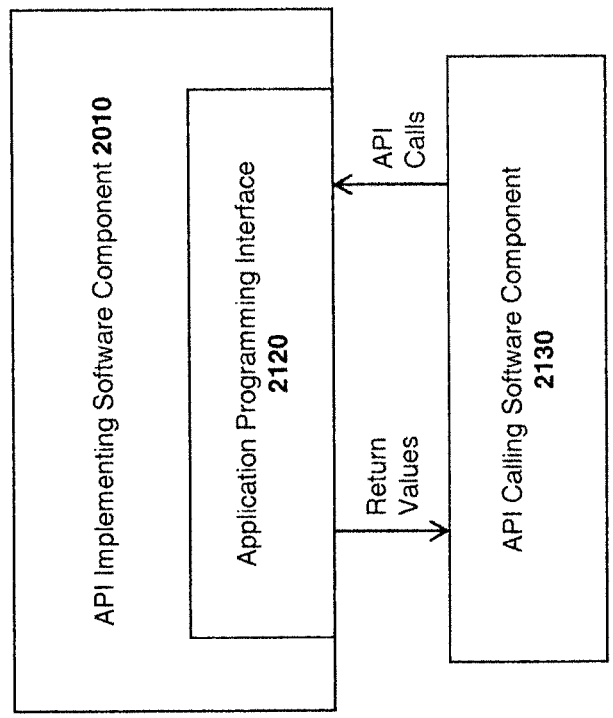
FIG. 21 illustrates one embodiment of an API implementing software component and an API calling software component.

FIG. 21 illustrates one embodiment of an API architecture which includes an API implementing software component 2110 (e.g., an operating system, a library, a device driver, an API, an application program, or other software module) that implements the API 2120. The API 2120 specifies one or more functions, methods, classes, objects, protocols, data structures, formats and/or other features of the API implementing software component that may be used by the API calling software component 2130. The API 2120 can specify at least one calling convention that specifies how a function in the API implementing software component receives parameters from the API calling software component and how the function returns a result to the API calling software component. The API calling software component 2130 (e.g., an operating system, a library, a device driver, an API, an application program, or other software module), makes API calls through the API 2120 to access and use the features of the API implementing software component 2110 that are specified by the API 2120. The API implementing software component 2110 may return a value through the API 2120 to the API calling software component 2130 in response to an API call.

It will be appreciated that the API implementing software component 2110 may include additional functions, methods, classes, data structures, and/or other features that are not specified through the API 2120 and are not available to the API calling software component 2130. It should be understood that the API calling software component 2130 may be on the same system as the API implementing software component 2110 or may be located remotely and accesses the API implementing software component 2110 using the API 2120 over a network. While FIG. 21 illustrates a single API calling software component 2130 interacting with the API 2120, it should be understood that other API calling software components, which may be written in different languages (or the same language) than the API calling software component 2130, may use the API 2120.

The API implementing software component 2110, the API 2120, and the API calling software component 2130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 22:
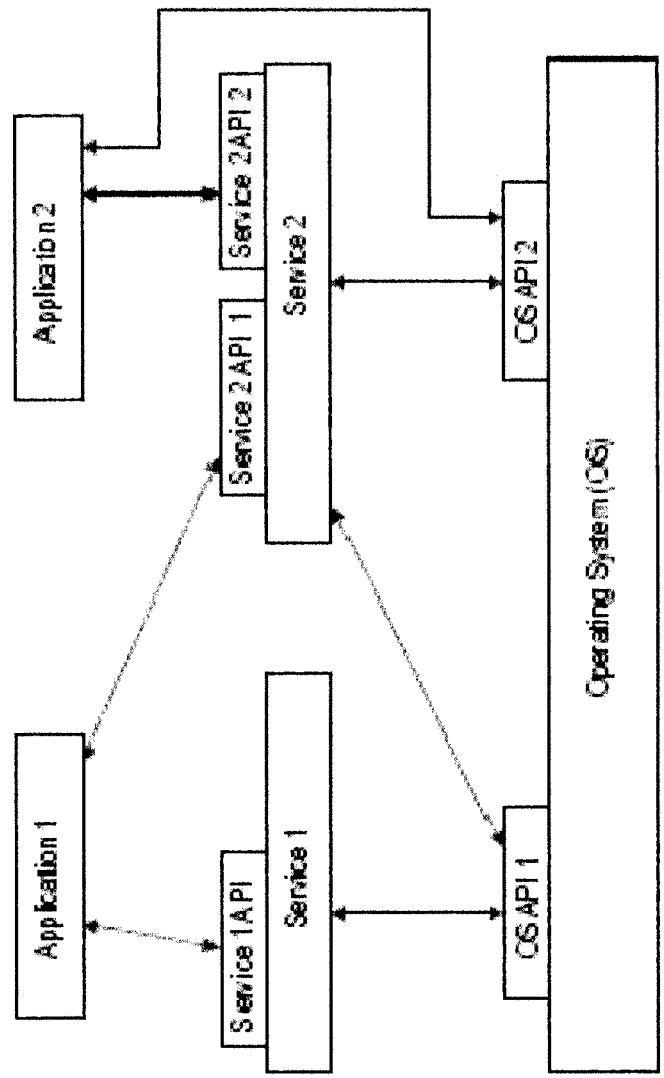
FIG. 22 illustrates one embodiment in which API calls are made between operating systems, services, and applications.

In FIG. 22 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 23:
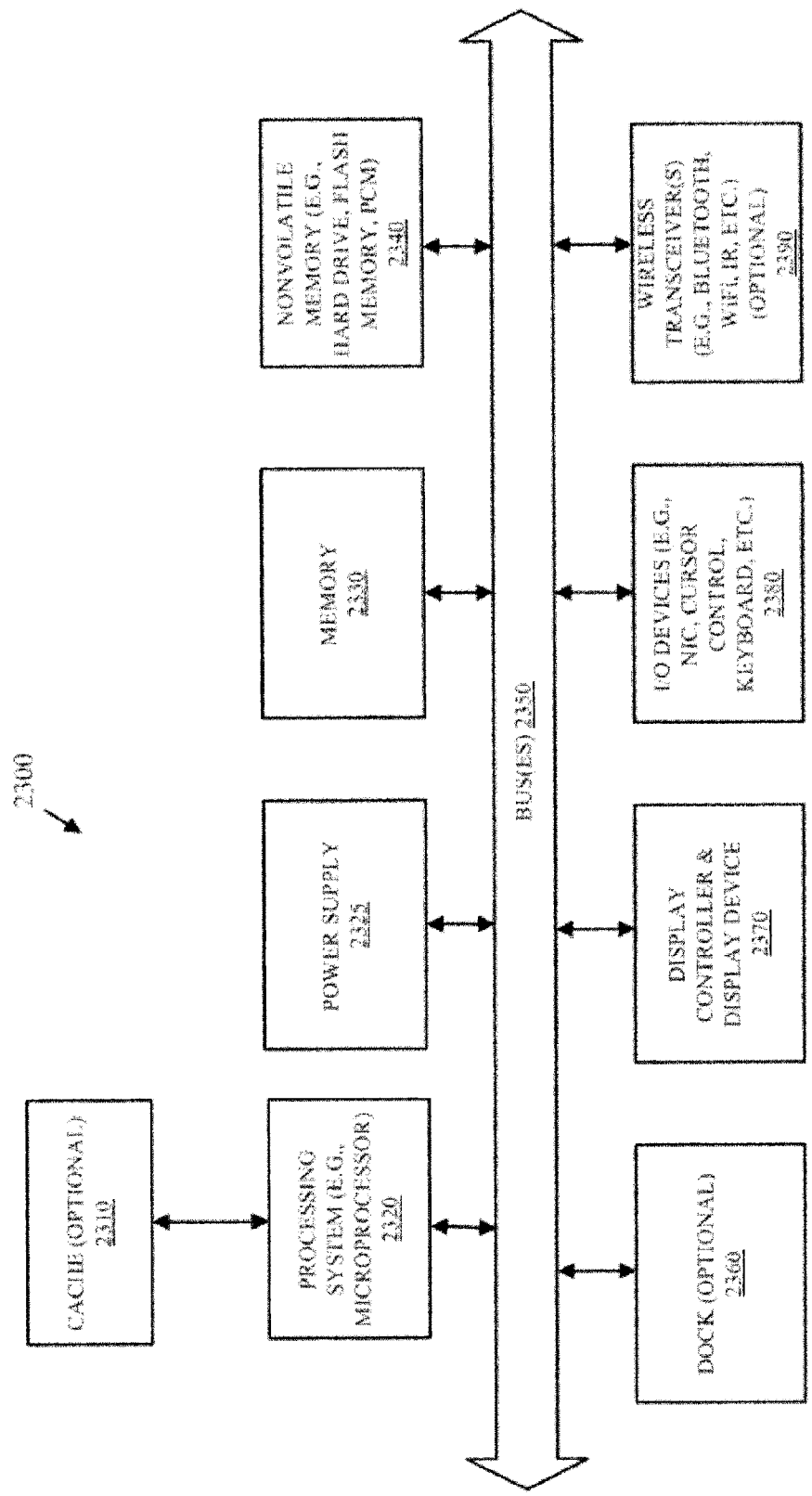
FIG. 23 illustrates one embodiment of an exemplary computer system architecture.

FIG. 23 is a block diagram illustrating an exemplary computer system which may be used in some embodiments of the invention. It should be understood that while FIG. 23 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 23, the computer system 2300, which is a form of a data processing system, includes the bus(es) 2350 which is coupled with the processing system 2320, power supply 2325, memory 2330, and the nonvolatile memory 2340 (e.g., a hard drive, flash memory, Phase-Change Memory (PCM), etc.). The bus(es) 2350 may be connected to each other through various bridges, controllers, and/or adapters as is well known in the art. The processing system 2320 may retrieve instruction(s) from the memory 2330 and/or the nonvolatile memory 2340, and execute the instructions to perform operations as described above. The bus 2350 interconnects the above components together and also interconnects those components to the optional dock 2360, the display controller & display device 2370, Input/Output devices 2380 (e.g., NIC (Network Interface Card), a cursor control (e.g., mouse, touchscreen, touchpad, etc.), a keyboard, etc.), and the optional wireless transceiver(s) 2390 (e.g., Bluetooth, WiFi, Infrared, etc.).

Figure 24:
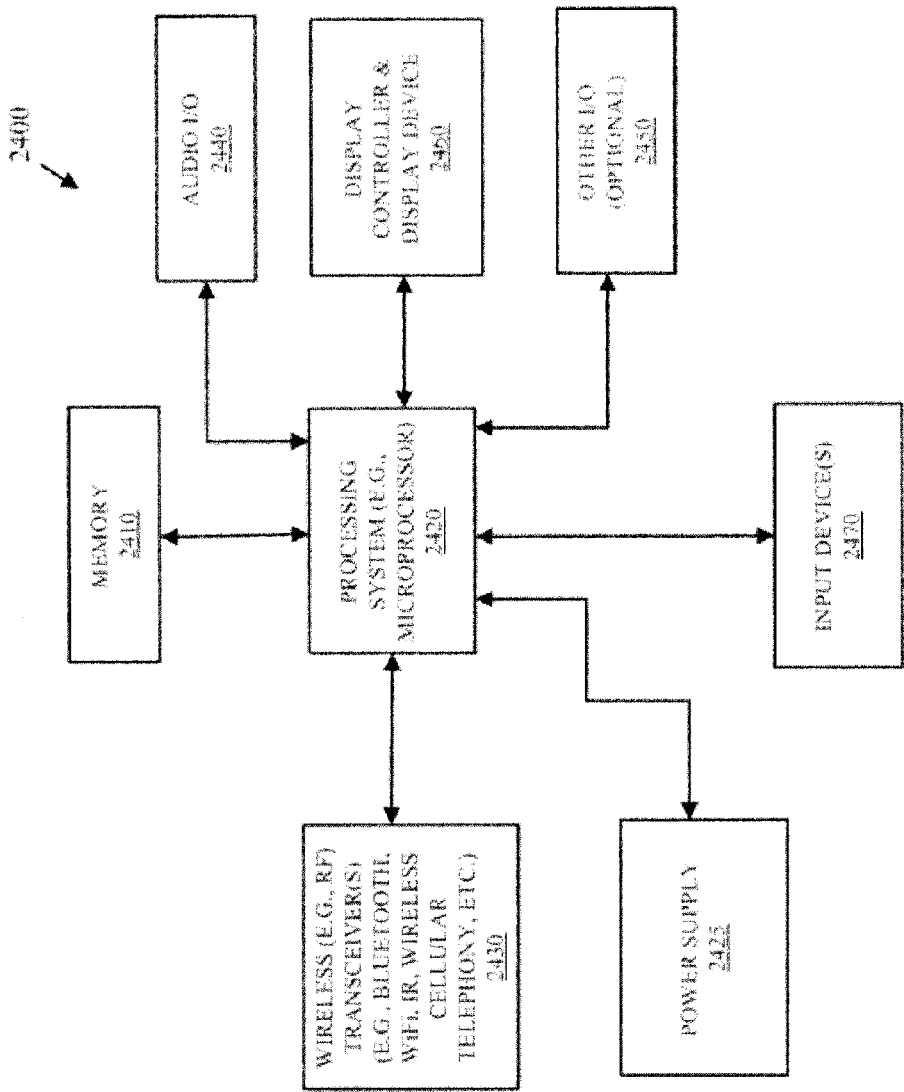
FIG. 24 illustrates another embodiment of an exemplary computer system architecture.

FIG. 24 is a block diagram illustrating an exemplary data processing system which may be used in some embodiments of the invention. For example, the data processing system 2400 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 2400 may be a network computer or an embedded processing device within another device.

According to one embodiment of the invention, the exemplary architecture of the data processing system 2400 may used for the mobile devices described above. The data processing system 2400 includes the processing system 2420, which may include one or more microprocessors and/or a system on an integrated circuit. The processing system 2420 is coupled with a memory 2410, a power supply 2425 (which includes one or more batteries) an audio input/output 2440, a display controller and display device 2460, optional input/output 2450, input device(s) 2470, and wireless transceiver(s) 2430. It will be appreciated that additional components, not shown in FIG. 24, may also be a part of the data processing system 2400 in certain embodiments of the invention, and in certain embodiments of the invention fewer components than shown in FIG. 24 may be used. In addition, it will be appreciated that one or more buses, not shown in FIG. 24, may be used to interconnect the various components as is well known in the art.

The memory 2410 may store data and/or programs for execution by the data processing system 2400. The audio input/output 2440 may include a microphone and/or a speaker to, for example, play music and/or provide telephony functionality through the speaker and microphone. The display controller and display device 2460 may include a graphical user interface (GUI). The wireless (e.g., RF) transceivers 2430 (e.g., a WiFi transceiver, an infrared transceiver, a Bluetooth transceiver, a wireless cellular telephony transceiver, etc.) may be used to communicate with other data processing systems. The one or more input devices 2470 allow a user to provide input to the system. These input devices may be a keypad, keyboard, touch panel, multi touch panel, etc. The optional other input/output 2450 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

What is claimed is:

1. A mobile data processing system, comprising:
a memory for storing program code;
a processor for processing the program code to generate an application framework including a first application programming interface (API) implementing component that implements an API, wherein the API exposes one or more functions to an API-calling component, the functions including a peer-to-peer ("P2P") connection function for establishing a P2P communication connection with another data processing system, wherein upon calling of the P2P connection function, the application framework performs the operations of:
transmitting a connection request to a first network service to establish a P2P connection with one or more other mobile data processing systems, the connection request including NAT traversal data needed to traverse a NAT device to communicate with the mobile data processing system;
receiving a connection data structure from the network service, the connection data structure including NAT traversal data for each of the one or more other mobile data processing systems;
attaching connection data for the mobile data processing system to the connection data structure and transmitting the connection data structure with the connection data to a connection data exchange service; and
receiving connection data of the one or more other mobile data processing systems from the connection data exchange service; and
using the connection data to establish P2P connections with the one or more other mobile data processing systems.

2. The mobile data processing system as in claim 1 wherein upon calling of the P2P connection function, the application framework performs the additional operations of:
- transmitting a network address translation ("NAT") traversal data request; and
- receiving a NAT traversal data response including a public network address and port needed to traverse the NAT device to communicate with the mobile data processing system.

3. The mobile data processing system as in claim 2 wherein the NAT traversal data further includes NAT type data indicating a NAT device type.

4. The mobile data processing system as in claim 1 wherein the P2P connection function comprises a match function and wherein the network service comprises a matchmaking service receiving requests for P2P matches from a plurality of mobile data processing systems, the matchmaking service matching the mobile data processing system with the one or more other mobile data processing systems for a P2P session based on a set of matching criteria and responsively generating the connection data structure identifying the NAT traversal data for each of the plurality of mobile computing devices.

5. The mobile data processing system as in claim 1 wherein the P2P connection function comprises an invitation function identifying a second mobile data processing system, and wherein the network service comprises an invitation service receiving an invitation request from the application framework requesting a P2P connection with the second mobile data processing system, the invitation service responsively generating the connection data structure identifying each of the and second mobile data processing systems.

6. The mobile data processing system as in claim 1 wherein the P2P connections requested and established by the application framework comprise P2P sessions for a multiplayer game or a video chat.

7. The mobile data processing system as in claim 1 wherein the application framework is a game framework proving API functions for multi-player video games.

8. The mobile data processing system as in claim 7 wherein the gaming framework includes a game daemon to transmit the connection request to the first network service and to receive the connection data structure from the network service.

9. The mobile data processing system as in claim 8 wherein the gaming framework includes a game services module to transmit the connection data structure with the connection data to a connection data exchange service and to receive connection data of the one or more other mobile data processing systems from the connection data exchange service.

10. The mobile data processing system as in claim 9 wherein the game services module communicates with the connection data exchange service using User Datagram Protocol ("UDP") sockets and wherein the game daemon communicates to the network service using Hypertext Transport Protocol Secure ("HTTPS").

11. The mobile data processing system as in claim 8 wherein the game daemon comprises a cache for storing copies of data received from the network service and one or more other network services.

12. The mobile data processing system as in claim 11 wherein at least one of the other network services comprises a friends service and wherein the cache stores copies of a user's friends list.

13. The mobile data processing system as in claim 1 wherein the application framework comprises a communication buffer for storing communication streams generated by a user of the mobile data processing system prior to using the connection data to establish the P2P connections with the one or more other mobile data processing systems.

14. The mobile data processing system as in claim 13 wherein the communication streams comprise text, audio or video generated by the user.

15. The mobile data processing system as in claim 8 wherein the game daemon receives the connection data structure from a push notification service.

16. A non-transitory machine-readable medium having program code stored thereon which, when executed by a processor of a first mobile data processing system, causes the processor to generate an application framework including a first application programming interface (API) implementing component that implements an API, wherein the API exposes one or more functions to an API-calling component, the functions including a peer-to-peer ("P2P") connection function for establishing a P2P communication connection with another data processing system, wherein upon calling of the P2P connection function, the application framework performs the operations of:
- transmitting a connection request to a first network service to establish a P2P connection with one or more other mobile data processing systems, the connection request including NAT traversal data needed to traverse a NAT device to communicate with the first mobile data processing system;
- receiving a connection data structure from the network service, the connection data structure including NAT traversal data for each of the one or more other mobile data processing systems;
- attaching connection data for the first mobile data processing system to the connection data structure and transmitting the connection data structure with the connection data to a connection data exchange service; and
- receiving connection data of the one or more other mobile data processing systems from the connection data exchange service; and
- using the connection data to establish P2P connections with the one or more other mobile data processing systems.

17. The non-transitory machine-readable medium as in claim 16 wherein upon calling of the P2P connection function, the application framework performs the additional operations of:
- transmitting a network address translation ("NAT") traversal data request; and
- receiving a NAT traversal data response including a public network address and port needed to traverse the NAT device to communicate with the first mobile data processing system.

18. The non-transitory machine-readable medium as in claim 17 wherein the NAT traversal data further includes NAT type data indicating a NAT device type.

19. The non-transitory machine-readable medium as in claim 16 wherein the P2P connection function comprises a match function and wherein the network service comprises a matchmaking service receiving requests for P2P matches from a plurality of mobile data processing systems, the matchmaking service matching the first mobile data processing system with the one or more other mobile data processing systems for a P2P session based on a set of matching criteria and responsively generating the connection data structure identifying the NAT traversal data for each of the plurality of mobile computing devices.

20. The non-transitory machine-readable medium as in claim 16 wherein the P2P connection function comprises an invitation function identifying a second mobile data processing system, and wherein the network service comprises an invitation service receiving an invitation request from the application framework requesting a P2P connection with the second mobile data processing system, the invitation service responsively generating the connection data structure identifying each of the first and second mobile data processing systems.

21. The non-transitory machine-readable medium as in claim 16 wherein the P2P connections requested and established by the application framework comprise P2P sessions for a multiplayer game or a video chat.

22. The non-transitory machine-readable medium as in claim 16 wherein the application framework is a game framework proving API functions for multi-player video games.

23. The non-transitory machine-readable medium as in claim 22 wherein the gaming framework includes a game daemon to transmit the connection request to the first network service and to receive the connection data structure from the network service.

24. The non-transitory machine-readable medium as in claim 23 wherein the gaming framework includes a game services module to transmit the connection data structure with the connection data to a connection data exchange service and to receive connection data of the one or more other mobile data processing systems from the connection data exchange service.

25. The non-transitory machine-readable medium as in claim 24 wherein the game services module communicates with the connection data exchange service using User Datagram Protocol ("UDP") sockets and wherein the game daemon communicates to the network service using Hypertext Transport Protocol Secure ("HTTPS").

26. The non-transitory machine-readable medium as in claim 23 wherein the game daemon comprises a cache for storing copies of data received from the network service and one or more other network services.

27. The non-transitory machine-readable medium as in claim 26 wherein at least one of the other network services comprises a friends service and wherein the cache stores copies of a user's friends list.

28. The non-transitory machine-readable medium as in claim 16 wherein the application framework comprises a communication buffer for storing communication streams generated by a user of the mobile data processing system prior to using the connection data to establish the P2P connections with the one or more other mobile data processing systems.

29. The non-transitory machine-readable medium as in claim 28 wherein the communication streams comprise text, audio or video generated by the user.

30. The non-transitory machine-readable medium as in claim 23 wherein the game daemon receives the connection data structure from a push notification service.

* * * * *